US011987707B2

(12) United States Patent
Chung et al.

(10) Patent No.: US 11,987,707 B2
(45) Date of Patent: May 21, 2024

(54) CARBON FIBER PRECURSORS AND PRODUCTION PROCESS

(71) Applicant: The Penn State Research Foundation, University Park, PA (US)

(72) Inventors: Tze-Chiang Chung, State College, PA (US); Houxiang Li, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 286 days.

(21) Appl. No.: 17/633,465

(22) PCT Filed: Aug. 4, 2020

(86) PCT No.: PCT/US2020/044839
§ 371 (c)(1),
(2) Date: Feb. 7, 2022

(87) PCT Pub. No.: WO2021/034499
PCT Pub. Date: Feb. 25, 2021

(65) Prior Publication Data
US 2022/0363904 A1    Nov. 17, 2022

Related U.S. Application Data

(60) Provisional application No. 62/883,317, filed on Aug. 6, 2019.

(51) Int. Cl.
*C08L 95/00* (2006.01)
*C01B 32/05* (2017.01)
(Continued)

(52) U.S. Cl.
CPC .............. *C08L 95/00* (2013.01); *C01B 32/05* (2017.08); *C08F 10/02* (2013.01); *C08F 38/02* (2013.01);
(Continued)

(58) Field of Classification Search
None
See application file for complete search history.

(56) References Cited

U.S. PATENT DOCUMENTS 4,891,126 A * 1/1990 Mochida ................. D01F 9/155
208/22
2016/0297714 A1* 10/2016 Bertarelli ................ G21F 1/125

FOREIGN PATENT DOCUMENTS

| CN | 105295368 A | 2/2016 |
| JP | 3-90625 A | 4/1991 |
| JP | 2009-191392 A | 8/2009 |

OTHER PUBLICATIONS

Written Opinion of the International Searching Authority for PCT/US2020/044839, dated Mar. 11, 2021.
(Continued)

*Primary Examiner* — Yung-Sheng M Tsui
*Assistant Examiner* — Melody Tsui
(74) *Attorney, Agent, or Firm* — Buchanan Ingersoll & Rooney PC

(57) ABSTRACT

A new class of cost-effective carbon fiber precursors that comprise both hydrocarbon polymer and Pitch structural features in the same polymer structure to exhibit complementary advantages of both PAN- and Pitch-based carbon fiber precursors. The new class of carbon fiber precursors comprise a polymeric pitch copolymer, wherein the polymeric pitch copolymer includes a polymer chain and several pitch polycyclic aromatic hydrocarbon (PAH) molecules grafted or chemically bonded to the polymer chain. Method and processes for the creation of the new class of carbon fiber precursors are also presented, wherein said methods may comprise a thermally-induced coupling and extrusion step.

23 Claims, 17 Drawing Sheets

(51) Int. Cl.
    *C08F 10/02*     (2006.01)
    *C08F 38/02*     (2006.01)
    *D01D 5/06*     (2006.01)
    *D01D 5/08*     (2006.01)
    *D01F 6/30*     (2006.01)

(52) U.S. Cl.
    CPC ............... *D01D 5/06* (2013.01); *D01D 5/08* (2013.01); *D01F 6/30* (2013.01); *C08L 2203/12* (2013.01)

(56) References Cited

OTHER PUBLICATIONS

International Search Report for PCT/US2020/044839, dated Mar. 18, 2021.

Huang, X., Fabrication and Properties of Carbon Fibers, Materials, 2009, pp. 2369-2403, Open Access.

Lee, S. et al., Structural Evolution of Polyacrylonitrile Fibers in Stabilization and Carbonization, Advances in Chemical Engineering and Science, 2012, pp. 275-282, Scientific Research.

Morris, E.A. et al., High Performance Carbon Fibers from Very High Molecular Weight Polyacrylonitrile Precursors, Carbon, 2016, pp. 245-252, Elsevier Ltd.

Liu, F. et al., Effect of Microstructure on the Mechanical Properties of PAN-Based Carbon Fibers During High-Temperature Graphitization, J. Mater. Sci., 2008, pp. 4316-4322, Springer Science+Business Media, LLC.

Dickinson, E.M., Average Structures of Petroleum Pitch Fractions by 1H/13C n.m.r. Spectroscopy, Fuel, 1985, pp. 704-706, vol. 64, Butterworth & Co. (Publishers) Ltd.

Cristadoro, A. et al., Structural Characterization of the Oligomeric Constituents of Petroleum Pitches, Carbon, 2009, pp. 2358-2370, Elsevier Ltd.

Brooks, J.D. et al., The Formation of Graphitizing Carbons from the Liquid Phase, Carbon, 1965, pp. 185-193, vol. 3, Pergamon Press Ltd.

Matsumoto, T., Mesophase Pitch and Its Carbon Fibers, Pure & Appl. Chem., 1985, pp. 1553-1562, vol. 57.

Liu, C. et al., Fabrication and Characterization of Carbon Nanofibers From Polyacrylonitrile/Pitch Blends, J. Appl. Polym. Sci., 2017, pp. 1-7, Wiley Periodicals, Inc.

Cheng, Y. et al., Preparation and Characterization of Mesophase Pitch via Co-Carbonization of Waste Polyethylene/Petroleum Pitch, Journal of Materials Science & Technology, 2015, pp. 857-863, Elsevier Ltd.

Baker, D.A. et al., Recent Advances in Low-Cost Carbon Fiber Manufacture from Lignin, J. Appl. Polym. Sci., 2013, pp. 713-728, Wiley Periodicals, Inc.

Krumpfer, J.W. et al., Poly(Methyl Vinyl Ketone) as a Potential Carbon Fiber Precursor, Chem. Mater., 2017, pp. 780-788, ACS Publications.

Pimenta, M.A. et al., Studying Disorder in Graphite-Based Systems by Raman Spectroscopy, Phys. Chem. Chem. Phys., 2007, pp. 1276-1291, RSC Publishing.

Takaku, A. et al., X-ray Measurements and the Structure of Polyacrylonitrile- and Pitch-Based Carbon Fibres, Journal of Materials Science, 1990, pp. 4873-4879, Chapman and Hall Ltd.

Smiley, R. J. et al., AFM, SEM and XPS Characterization of PAN-Based Carbon Fibres Etched in Oxygen Plasmas, Journal of Materials Science, 1993, pp. 3601-3611, Chapman and Hall Ltd.

\* cited by examiner

CARBON FIBER PRECURSORS AND PRODUCTION PROCESS

CROSS-REFERENCE TO RELATED APPLICATIONS

This application is the United States national stage application of International Patent Application No. PCT/US2020/044839, filed on Aug. 4, 2020, which is related to and claims the benefit of U.S. Provisional Application No. 62/883,317, filed on Aug. 6, 2019, which is incorporated by reference in its entirety.

GOVERNMENT SPONSORSHIP

The present invention was made with government support under Grant No. DE-EE0008096 awarded by the Department of Energy-EERE. The Government has certain rights in the invention.

BACKGROUND OF THE INVENTION

Summary of the Invention

The present invention relates to a new class of carbon fiber (CF) precursors and the associated production process that offers a cost-effective method in forming high strength CF products.

Field of the Invention

Carbon fibers and composites are strategically important materials for many high-end applications, including aerospace, defense, automotive, energy, high performance sports goods, etc. The combination of light weight, high mechanical strength (high strength-to-volume ratio), good high temperature stability, low thermal expansion, and high chemical resistance, offers many advantages in considering the applications.

These material characteristics are essential to many industries that consider increasing their product performance with energy efficiency and environmental concerns, especially the applications in transportation and green energy sectors. Employing CF-enforced composites in the transportation and energy industries would aid in addressing the challenging issues of climate change, clean energy generation and storage. Currently, the transportation industry is responsible for over two-thirds of petroleum usage and one-third of the world's carbon footprint.

It is well-known that weight reduction of transportation vessels would lead to efficient fuel usage. Every 10% reduction in weight would result in about a 7% decrease in fuel usage. Hence, the replacement of the heavy metal components with CF composites in every vehicle could effectively curtail fuel consumption, leading to a cleaner and healthier environment.

Also, the increasing sizes of windmills to harvest more energy from wind requires larger windmill blades. The blades are typically more than 60 meters long and would need over 90% CF composites for their fabrication. Thus, expanding CF applications to not just vehicles but to alternate sources of energy could further remedy many energy and environmental issues Currently, more than 90% of commercial carbon fibers are produced from polyacrylonitrile (PAN) polymers. Despite the commercial success, current PAN based CFs face many technical challenges and high production cost issues.

During the production process, including fiber spinning and thermal conversion, PAN fibers are constantly under mechanical tension (drawing) to control fiber morphology. The mechanical tension removes the voids (defects) created by the removal of solvent during the wet-spinning and volatile by-products during thermal conversion, as well as resulting in the parallel orientation of graphene sheets along the fiber direction.

The general fabrication route involves a fiber spinning process to form PAN precursor fiber, followed by subsequent carbon conversion reactions under elevated temperature conditions to transform the PAN precursor fibers to carbon fibers. Unfortunately, PAN precursor fibers cannot be produced by common (inexpensive) melt-spinning process. As a result, wet-spinning is employed to spin PAN polymers into precursor fibers. Expensive and toxic solvents (DMF) are used in this wet-spinning process, which have adverse effects on the CF production cost and elicit environmental concerns.

In the thermal conversion process, there are two distinctive reaction steps, including stabilization reactions under air and low temperature (<300° C.) and carbonization under inert gas at high temperatures (>1000° C.). The stabilization mechanism involves oxygen-assisted crosslinking and polymerization of nitrile groups, followed by dehydrogenation to form a ladder-like polymer structure with conjugated cyclic moieties and some undesirable oxygen-containing functional groups. The resulting ladder-like chain structure, with high bonding energy along the polymer chain, is essential for the subsequent carbonization to drive off non-carbon atoms (N, O, and H atoms) that are usually accompanied with carbon (C) atoms in the volatile by-products (toxic gases). The release of toxic gases (i.e. HCN, CO, etc.) leads to both environmental and health risk and reduces the carbon yield (C-yield).

Low C-yield (~50%) also significantly increases CF production cost. The final CF molecular structure contains >90% carbon atoms arranged in the hexagonal graphene sheets that are aligned along the fiber direction with a few micrometers in diameter. The in situ continuous drawing of the fiber is essential to achieve the desirable CF morphology, with the reduced defects and the orientation of graphene sheets along the fiber direction.

In the past several decades, there has been a constant research interest in developing new low-cost and highly efficient polymer precursors with alternative CF manufacturing processes. Few prior approaches showed very limited success, which included polymer blends with Pitch molecules. However, the physical mixing between two incompatible materials (polymer and Pitch) causes phase separation and poor experimental results.

Some studies were focused on naturally occurring polymers and fibers. Although they possess a low cost, they generally have limited processability in fiber forming and offer low C-yields with poor mechanical properties.

One study involved the application of sulfonated polyethylene (PE) fiber as the CF precursor. These fibers were prepared by a post-polymerization process that involved a sulfonation reaction of commercially available PE fibers. Although low-cost PE fibers possess good tensile strength for mechanical drawing, the sulfonating reaction on highly crystalline PE fibers (i.e. heterogeneous reaction condition) is very difficult and problematic. The combination of solid-state diffusion difficulties and high crystallinity of a PE matrix resulted in: (i) an inhomogeneous sulfonation level from surface to core of PE fiber, (ii) most of the sulfonation reaction only happened in amorphous domains (only a small portion of PE fiber), and (iii) a sulfonation reaction involving toxic chemicals, i.e. chlorosulfonic or sulfuric acid. The resulting inhomogeneous functional groups distribution significantly impaired the effectiveness of stabilization and the subsequent carbonization reaction. As seen with PAN precursors, the thermal conversion process of the sulfonated PE fibers must be stabilized in air to form a mixed stabilization adducts, which resulted in a low C-yield and CF with reduced mechanical properties.

Pitch material (both isotropic and mesophase) is an alternative CF precursor with some advantages over PAN, such as low precursor cost, convenient melt-spinning into fiber, significant higher C-yield for mesophase pitch (>70%), but forming CF with lower tensile strength.

Isotropic Pitch resins are the distillation residues of petroleum or coal tar, containing a complex mixture of polycyclic aromatic hydrocarbon (PAH) molecules with various 3-6 fused rings and π-electron conjugated structures (average molecular weight in the range of 200-700 g/mol). They are dark viscous substance (solid at ambient temperature) with an isotropic (amorphous) morphology and softening temperature in the range of 80-250° C. Upon thermal treatment of isotropic Pitch material at around 400° C., further ring-fusion reactions take place to increase its molecular weight to the range of 600-1200 g/mol with some disk-like (anisotropic) crystalline domains, due to the stacking of large fused π-electrons delocalized rings.

Mesophase pitch is formed with a semi-crystalline morphology. The degree of crystallinity is proportional to the heating temperature, along with softening temperature (>250° C.).

Both isotropic and mesophase pitches can be extruded into fiber form using conventional melt-extrusion process (no solvent and low-cost). Subsequently, the pitch fiber is then thermally converted to the corresponding CF under similar thermal conditions seen with PAN fibers (stabilization in air and carbonization under inert atmosphere) but without mechanical drawing.

Many reports suggested that the relatively low tensile strength in mesophase pitch fanned CF products is associated with structural defects and poor alignment of graphene sheets along the fiber direction. Unfortunately, due to low molecular weight and low melt viscosity of pitch precursors (both isotropic and mesophase) the in situ fiber drawing (tension) cannot be applied during the entire production process (opposite to the constant drawing in the PAN case).

PAN- and Pitch-based CFs offer an opposite but complementary set of advantage and disadvantage features. Hence, an objective of the present invention is to provide a new precursor material that has all the advantage features of both CFs in the same material while eliminating all or most of the disadvantage features. From pitch precursor viewpoint, the problem of fanning high-quality CF products is stemmed from low molecular weight and low melt viscosity.

BRIEF SUMMARY OF INVENTION

One aspect of the present invention is a new class of CF precursors that can provide a cost-effective method for producing high strength carbon fiber products. This new class of CF precursors may comprise both polymer and Pitch structural features in the same precursor structure, thus offering a class of CF precursors that can exhibit the complementary advantages of both PAN- and Pitch-based CFs.

Another aspect of the present invention relates to methods for forming and processing the new class of CF precursors.

The methods disclosed herein may comprise mixing a pitch resin and a reactive polymer under elevated temperatures to form a polymeric pitch copolymer, a thermal conversion process.

DETAILED DESCRIPTION OF THE INVENTION

Definitions

As used herein the term "comprising" or "comprises" as used in reference to compositions, methods, etc. refers to component(s) or method steps that are present in the method or composition, yet allows for the composition, method, etc. to also include unspecified elements.

As used herein the term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of elements that do not materially affect the basic and novel or functional characteristic(s) of that embodiment.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

Detailed Embodiments of the Invention

The present invention relates to a new class of CF precursors that can provide a cost-effective method for producing high strength carbon fiber products. A major design principle is to incorporate both polymer and Pitch structural features in the same precursor structure, in such a way that it can exhibit the complementary advantages of each precursor.

Figure 1:
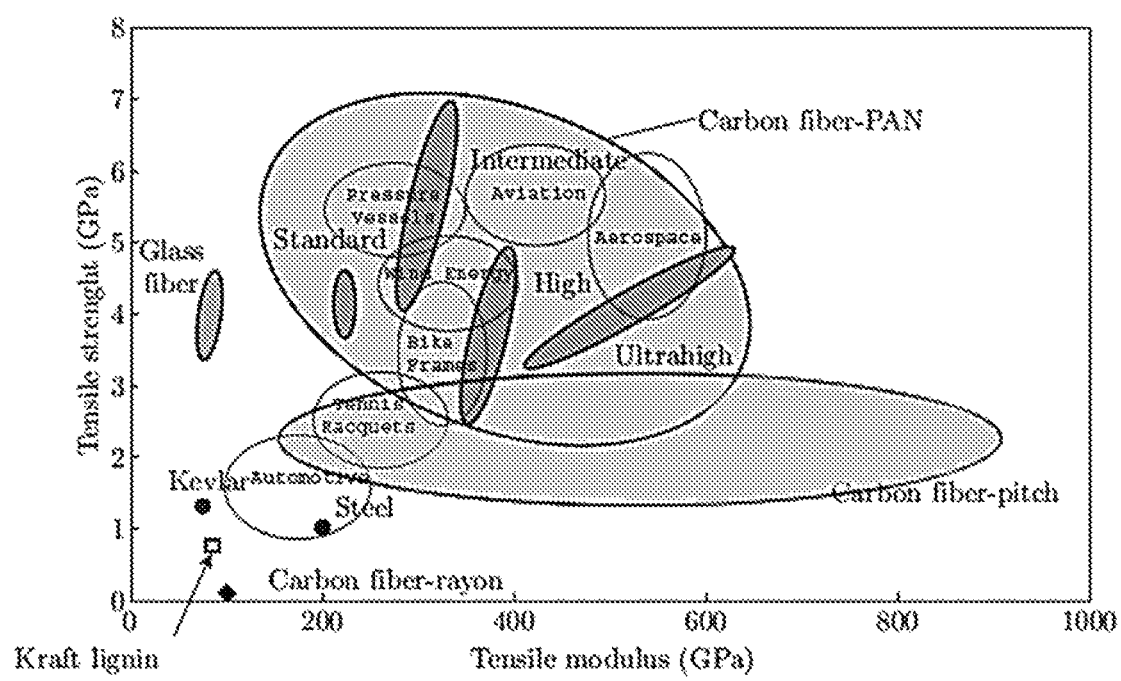
FIG. 1 illustrates the mechanical properties and application areas of two types of commercial carbon fibers prepared from PAN and Pitch precursors, respectively.

As shown in FIG. 1 and Table 1, pitch resin is an alternative of CF precursor with a complemental advantages and disadvantage features when compared with a PAN precursor. Though both fibers possess favorable mechanical properties, they also possess their own unique advantages and disadvantages in terms of CF production, which are depicted in Table 1.

TABLE 1

| Advantages (✓) and disadvantages (x) of PAN and Pitch precursors for CF production. | | |
|---|---|---|
| | PAN | Pitch |
| Cost of Precursor | (x)High | (✓)Low |
| Fiber Fabrication | (x)Wet-Spinning | (✓)Melt-Spinning |
| Cost of Fiber Fabrication | (x)High | (✓)Low |
| C-Yield | (x)Low (50%) | (✓)High (75-80%) |
| By-Products (gases) | (x)Environmental | (✓)Relatively safe |
| | concerns | |
| Molecular Weight | (✓)High | (x)Low |
| Stretching during Process | (✓)Yes | (x)No |
| Chain/Domain Orientation in CF | (✓)Aligned | (x)Isotropic |
| CF Structural Defect | (✓)Low | (x)High |
| Tensile Strength | (✓)High | (x)Low |

Despite the high strength of PAN-based carbon fibers, the current best commercially available CF products are still less than 10% its theoretical tensile strength value. Most of CF strength is concentrated in the fiber surface areas. As discussed, the current manufacturing process for producing carbon fibers involves a complicated thermal conversion process, involving stabilization and carbonization mechanisms. The resulting CF properties are strongly dependent on the fabrication details. Due to slow 02 diffusion rate in PAN polymer matrix, the stabilization reactions are very slow and difficult to achieve the uniform conjugated and crosslinked polymer structure, especial in the interior portion of the fiber. The inhomogeneity of 02-induced stabilization reactions lead to inhomogeneous carbonization reaction and the final CF morphology. In addition, the long stabilization process, under oxygen atmosphere and elevated temperature conditions, also produces many undesirable oxidized moieties along the ladder-like polymer structure. During the carbonization, the inevitable mass liberation of gases creates many voids in the solid matrix, which not only reduces the overall C-yield but also requires careful stretching to heal the voids and align the in situ formed graphene sheets along the fiber direction.

The major Pitch advantages include low precursor cost, convenient (low-cost) melt-spinning into fiber, significant higher C-yield (>70%). However, Pitch-based CFs exhibit lower tensile strength that is essential to many structural applications.

The relatively low tensile strength in pitch CF products is associated with structural defects and poor alignment of graphene sheets along the fiber direction. The low molecular weight and low melt viscosity of pitch precursors (both isotropic and mesophase) hinders the in situ fiber drawing (tension) from being applied during the entire production process (opposite to the constant drawing in the PAN case). Hence, this aspect of the invention directly addresses this issue by designing a new polymeric pitch molecular structure that has high molecular weight and high melt viscosity.

The CF precursors disclosed herein comprise a polymeric pitch copolymer, wherein the polymeric pitch copolymer includes a polymer chain and several pitch polycyclic aromatic hydrocarbon (PAH) molecules grafted or chemically bonded to the polymer chain.

The polymeric pitch copolymer may be comprised of a polymer chain that is a pure hydrocarbon polymer and several pitch polyaromatic molecules as the side groups that are chemically bonded to the polymer chain (backbone).

The hydrocarbon polymer chain structure may include, but is not limited to, polyethylene (PE), polypropylene, poly(1-butene), poly(1-pentene), poly(1-hexene), polystyrene, poly(methylstyrene), poly(isobutylene), polybutadiene, polyisoprene, polyacetylene, poly(phenylacetylene), and their copolymers.

In preferred embodiments, the hydrocarbon polymer chains are polyethylene, polystyrene, and poly(phenylacetylene) since these polymers have a low material cost, large availability.

In one embodiment, the hydrocarbon polymer backbone comprises a polyethylene copolymer containing reactive styrenic comonomer units, including 1,4-divinylbenzene (DVB), 4-chlorostyrene, 4-bromostyrene, 4-iodostyrene, (4-ethynyl)styrene, (4-phenylethynyl)styrene comonomer units.

In other embodiments, the polymeric pitch copolymers comprise either or both of the following structures:

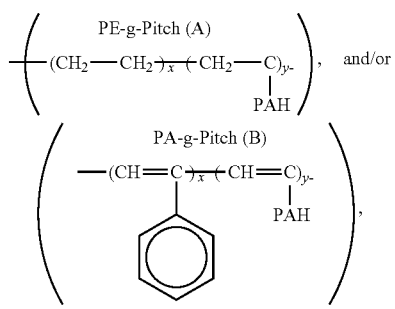

wherein x can be an integer repeating units ranging from 0 to 50,000 and
wherein y can be an integer repeating units ranging from 10 to 10,000.

In preferred embodiments, the polymeric pitch copolymers are based on a PE-g-Pitch (A) polymeric pitch copolymer structure, wherein the structure comprises a polyethylene (PE) polymer chain and some PAH side chains derived from pitch molecules. The repeating ethylene units (x) can be in the range from 0 to 50,000, and the repeating PAH-containing comonomer units (y) can be in the range from 10 to 10,000.

In other embodiments, the polymeric pitch copolymers are based on a PA-g-Pitch (B) polymeric pitch copolymer structure, wherein the structure comprises a poly(phenylacetylene) polymer chain and some PAH side chains derived from pitch molecules. The repeating phenylacetylene units (x) can be in the range from 0 to 20,000, and the repeating PAH-containing comonomer units (y) can be in the range from 10 to 10,000.

The polymeric pitch copolymer comprises mixtures of pitch polycyclic aromatic hydrocarbon (PAH) molecules, wherein the PAH molecules may be composed of multiple aromatic rings (ring size from 2 to 12) and their derivatives. The PAH molecules may include, but are not limited to, diphenylacetylene, anthracene, phenanthrene, tetracene, chrysene, triphenylene, pyrene, pentacene, benzo[a]pyrene, corannulene, benzo[ghi]perylene, coronene, ovalene and their derivatives.

The PAH molecules may be derived from fossil fuels (i.e., petroleum pitch or coal tar pitch). The PAH molecules may also be synthesized by the oligomerization of small aromatic compounds, such as naphthalene. The PAH molecules may be derived from other pitch molecules as well.

The polymeric pitch copolymer may comprise PAH molecules, wherein the PAH molecules are a mixture of multiple aromatic rings (ring size from 2 to 12) with conjugated π-electrons and their derivatives.

In some embodiments, the concentration of PAH molecules in the polymeric pitch molecular structure may be from 3 mol % to 100 mol %. In other embodiments the concentration of PAH may be from 2 mol % to 100 mol %, from 5 mol % to 30 mol %, or from 7 mol % to 20 mol %.

The PAH molecules may possess a molecular weight range from 160 to 1200 g/mol.

Figure 2:
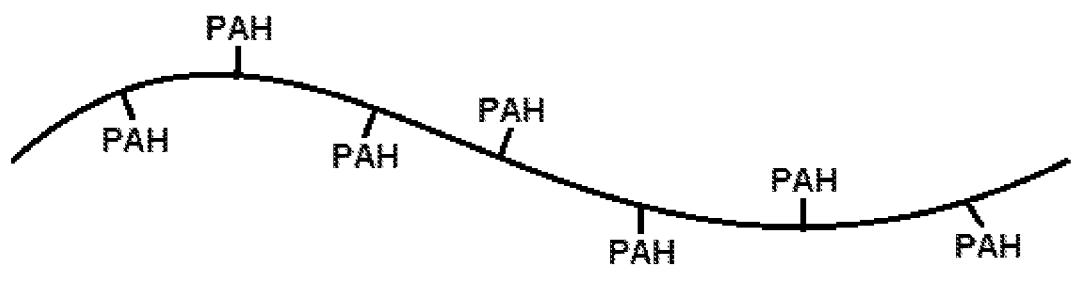
FIG. 2 illustrates a genetic structure of polymeric pitch copolymer with a hydrocarbon polymer backbone and pitch polycyclic aromatic hydrocarbon (PAH) side chains.

FIG. 2 depicts a polymeric pitch copolymer genetic structure comprising a hydrocarbon polymer backbone and PAH side chains. A major advantage of this polymeric pitch precursor is to offer high melt viscosity that allows continuous in situ drawing (mechanical tension) during melt-spinning and the subsequent thermal conversion processes.

The polymeric pitch copolymer may have a weight-average molecular weight ranged from 30,000 to 2,000,000 g/mol, preferably from 50,000 to 1,000,000 g/mol, and most preferably from 100,000 to 500,000 g/mol.

The polymeric pitch copolymer may have a polydispersity index between 1.1 and 20, preferably between 1.5 and 10, and most preferably between 2 and 5.

In other embodiments, the CF precursors may also include free (non-grafted) Pitch resin to serve as plasticizer and/or precursor. The presence of some un-grafted pitch molecules in the polymeric pitch copolymer offers many advantages, especially reducing the CF production cost and melt viscosity.

In embodiments the CF precursors include some free pitch resin, wherein the weight ratio between the polymeric pitch copolymer and the free pitch resin may be from 100/0 (pure polymer) to 1/100 (high pitch resin), preferably from 5/1 to 1/10, and most preferably from 3/1 to 1/3.

In some embodiments, the free pitch resin comprises a mixture of PAH molecules. In preferred embodiments, the free pitch resin comprises a mixture of PAH molecules that are the same as those on the polymeric pitch copolymer. In these preferred embodiments, the mixing is highly improved to where a uniform mixture can be obtained. Additionally, the polymeric pitch copolymer melt viscosity may be lowered, which can improve the fiber melt-spinning process, especially if the process comprises forming uniform precursor fibers with smooth surfaces and a controlled fiber diameter.

Another aspect of the present invention are new CF precursor production processes including a chemical synthesis route for the preparation of the polymeric pitch copolymers, fiber spinning processes for forming new precursor fibers, and thermal conversion process for preparing the carbon fibers. All of the CF production processes may be carried out under the same inert atmosphere conditions without the requirement of any external reagent, such as oxygen used in current PAN and Pitch precursors, during the stabilization step. The CF production processes may be achieved in a continuous manner with consecutive operational steps, by controlling the heating temperature for each step under an inert atmosphere, such as a nitrogen ($N_2$) atmosphere.

In some embodiments, the production processes for CF precursors comprises a method involving the following steps:
  adding pitch resin to a polymer to form a mixture, wherein the polymer chain possesses reactive side groups capable of engaging in a thermally-induced graft reaction with the pitch resin;
  stirring the mixture under elevated temperature condition until the formation of a polymeric pitch copolymer is complete.

In preferred embodiments, the method of forming CF precursors further comprises an extraction step.

In other embodiments, the method further comprises processing the resulting polymeric pitch copolymer by melt-spinning techniques to produce precursor fibers.

In some embodiments, the method further comprises processing the polymeric pitch copolymer by wet-spinning techniques to produce precursor fibers.

The chemical synthesis route to prepare the polymeric pitch copolymers may involve a reactive polymer chain containing some specific reactive side groups that can engage in facile thermal-induced coupling reactions with the PAH molecules at reactively low temperatures (<300° C.), without any external reagent or by-product. In preferred embodiments, the coupling reaction is performed under an inert atmosphere at a temperature below the polymer chain thermal decomposition temperature or pitch condensation (ring-fusion) reaction point. These preferred reaction conditions may assure that the formation of a melt-processible polymeric pitch copolymer is properly formed.

The reactive side groups of the polymer chain may include, but are not limited to, π-electrons conjugated hydrocarbon moieties, such as styrene, phenyl acetylene, diphenylacetylene and their derivatives. Examples of styrene derivatives include, but are not limited to, halides (Cl, Br, and I), alkenyl, alkynyl and phenylacetyl groups. These t-electron rich moieties can engage a typical Diels-Alder [2+4] cycloaddition reaction with the t-electron rich moieties in PAH pitch molecules.

The amount of monomers carrying reactive groups present on the polymer chain may range between 100 mol % and 1 mol %, preferably between 20 mol % and 3 mol %, and most preferably between 15 mol % and 3 mol % of the total monomer units in the polymer chain.

Figure 3:
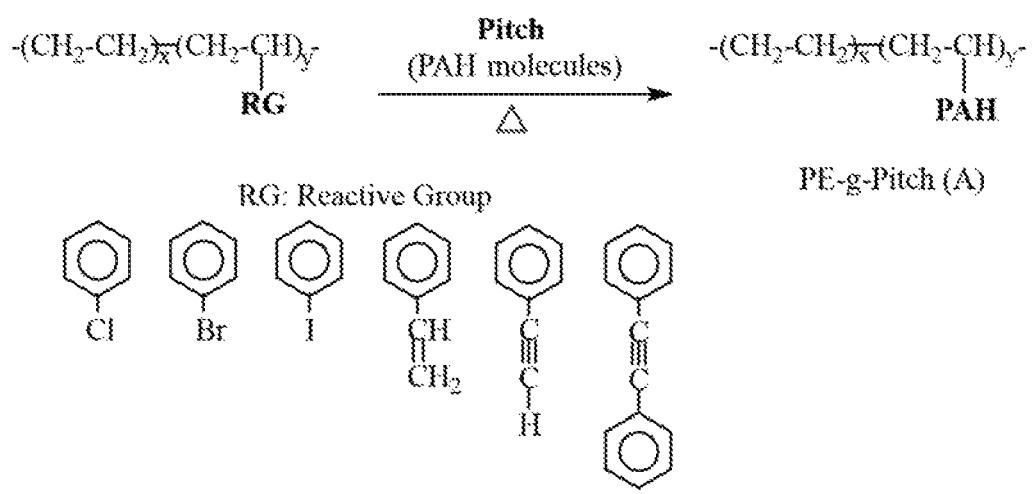
FIG. 3 illustrates the synthesis of a polymeric pitch copolymer PE-g-Pitch (A) with a thermal reaction between a PE copolymer with reactive side groups and pitch (PAH) resin.

FIG. 3 illustrates the preparation of a polymeric pitch copolymer with the PE-g-Pitch (A) structure. The preparation comprises using a functional PE copolymer that possesses reactive groups units which are thermal-sensitive and capable of reacting with PAH molecules under heat to form the polymeric pitch copolymer.

Figure 4:
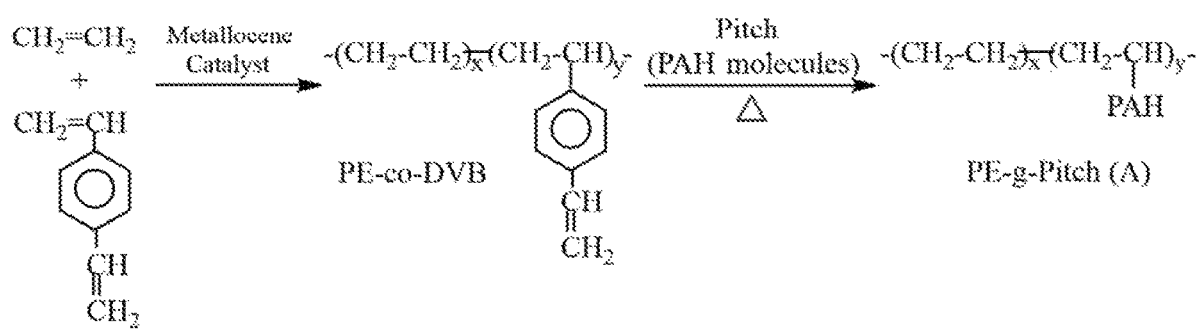
FIG. 4 illustrates the synthesis of PE-g-Pitch (A) precursor using PE-co-DVB copolymer that was prepared by a metallocene-mediated copolymerization between ethylene and divinylbenzene (DVB).

FIG. 4 illustrates a chemical route for the preparation of a PE-co-DVB copolymer chain and its use in the preparation of a PE-g-Pitch (A) polymeric pitch copolymer. The first step of the copolymerization reaction between ethylene and 1,4-divinylbenzene (DVB) with a mono-enchainment matter to form the PE-co-DVB copolymer is very effective when a selected metallocene catalyst system is used. The weight-average molecular weight of polymer chain may be in a range between 30,000 and 2,000,000 g/mol, preferably between 50,000 and 1,000,000 g/mol, and most preferably, between 100,000 and 500,000 g/mol. The polydispersity index of polymer chain may be between 1.5 and 5, preferably between 1.5 and 3, and most preferably between 1.5 and 2.5. The mole ratio of [ethylene]/[DVB] in polymer chain may be from 60/40 to 98/20, preferably from 70/30 and 95/5, and most preferably from 80/20 and 90/10.

The PE-g-Pitch (A) polymeric pitch copolymer was prepared by mixing PAH molecules and the resulting PE-co-DVB copolymer chain comprising some DVB comonomer units. Upon heating to about 150-200° C. under an inert atmosphere, a facile thermal-induced Diels-Alder cycloaddition reaction occurs between the pendant styrene moieties in the PE copolymer and the PAH molecules in the pitch material. This polymeric pitch precursor is soluble in common organic solvents and melt-processible with high melt viscosity, thus allowing in situ drawing. The pitch molecules in the PE chain maintain similar pitch ring-fusion reactivity during the carbonization reaction at temperatures >400° C. for converting the resulting polymeric pitch precursor fiber to a carbon fiber with a high C-yield.

Figure 5:
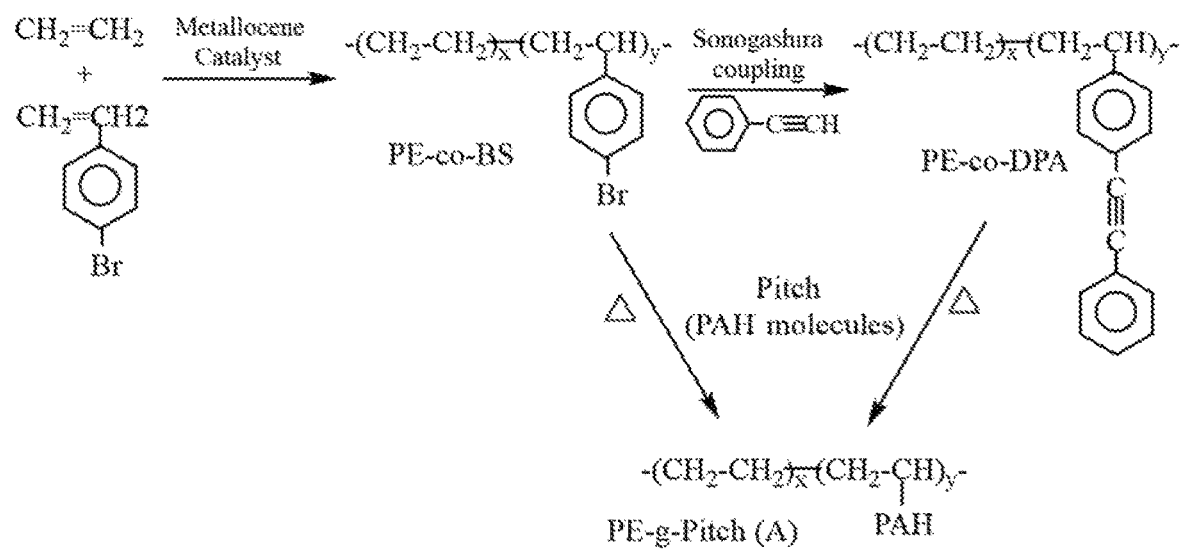
FIG. 5 illustrates a chemical route to prepare two representative PE copolymer chains, wherein the polymer chains comprise either a PE-co-BS structure with 4-bromostyrene comonomer units which may undergo a Sonogashira cross-coupling reaction to produce another polymer chain comprising diphenylacetylene side groups (PE-co-DPA). Both reactive PE copolymers can engage in a thermally-induced grafting reaction with PAH molecules to form PE-g-Pitch (A) precursor.

FIG. 5 shows a chemical route to prepare another two representative reactive PE polymer chains, wherein the polymer chains comprise either a PE-co-BS structure with 4-bromostyrene comonomer units which may undergo a Sonogashira cross-coupling reaction to produce another polymer chain comprising diphenylacetylene side groups (PE-co-DPA). The metallocene-mediated copolymerization between ethylene and 4-bromo-styrene comonomer is very effective to form random PE-co-BS polymer chains with high yield and high molecular weight. The 4-bromostyrene comonomer content is basically controlled by the comonomer feed ratio and the catalyst used. Through the application of CGC (constrained geometry catalyst), i.e. $[C_5Me_4(SiMe_2N^tBu)]TiCl_2$/MAO catalyst, we have obtained the PE-co-BS polymer chains with more than 10 mol % 4-bromostyrene comonomer content. The coupling reaction was catalyzed by a mixed $Pd(PPh_3)_4/CuCl/N(C_2H_5)_3$ catalyst system in DMF solution under mild reaction condition. Based on $^1H$ and $^{13}C$ NMR spectra, examining the samples before and after this coupling reaction, the Sonogashira reaction was almost quantitative in forming the corresponding PE-co-DPA polymer chains.

The chemical route for the preparation of polymer chains comprising 4-bromostyrene comonomer units may further comprises other reaction conditions. The reaction conditions may include, but are not limited to, those disclosed in Table 2.

TABLE 2

Summary of reaction conditions and results in the preparation of PE-co-BS copolymers

| | Copolymerization Condition | | | | Copolymer results | |
|---|---|---|---|---|---|---|
| Run | Catalyst* (umol/L) | Ethylene (psi) | 4-BS [M] | Temp/ Time (° C./min) | Cat. Efficiency (Kg/mol*hr) | 4-BS content (mol %) |
| A-1 | (I) 100 | 50 | 0.45 | 40/60 | 172 | 11.4 |
| A-2 | (I) 100 | 50 | 0.33 | 40/60 | 268 | 8.4 |
| A-3 | (I) 100 | 50 | 0.16 | 40/60 | 310 | 4.5 |
| A-4 | (I) 100 | 50 | 0.12 | 40/60 | 520 | 3.0 |
| B-1 | (II) 25 | 20 | 0.95 | 50/60 | 2000 | 3.8 |
| B-2 | (II) 25 | 20 | 0.32 | 50/60 | 1888 | 1.8 |
| B-3 | (II) 25 | 20 | 0.16 | 50/60 | 2363 | 1.1 |

*Catalyst (I): $[(C_5Me_4)SiMe_2N(t-Bu)]TiCl_2$/MAO; Catalyst (II): rac-Et(Ind)$_2$ZrCl$_2$/MAO; [Cat.]/[MAO] ratio: 1/1500.

In one embodiment, both PE-co-BS and PE-co-DPA polymer chains were applied to prepare PE-g-Pitch (A) polymeric pitch copolymers by simple mixing and heating procedures as described in FIG. 5. Both reactive PE copolymers can engage in a facile thermal-induced coupling reaction with PAH molecules by under relatively low pyrolysis temperature conditions (<320° C.) in an inert $N_2$ atmosphere. In preferred embodiments, the coupling reaction occurs without any external reagent, to form the corresponding PE-g-Pitch (A) polymeric pitch copolymers.

In a preferred embodiment, the chemical route for the preparation of PE-g-Pitch (A) polymeric pitch copolymers comprises the use of a PE-co-DPA copolymer containing 3 mol % DPA reactive comonomer units, wherein the PE-co-DPA copolymer is mixed with a Pitch resin that is completely soluble in toluene solvent. The mixture possesses a PE-co-DPA/Pitch weight ratio of 1/10. The mixture is agitated in a melt-mixer at 310° C. for 1 hr. The resulting mixture, containing PE-g-Pitch (A) polymeric pitch copolymer and free (unreacted) pitch molecules, is then subjected to Soxhlet extraction using toluene solvent to remove free Pitch molecules. After drying, the weight of the resulting PE-g-Pitch copolymer is about 21 wt. % of the starting PE-co-DPA/Pitch mixture. In other word, the resulting pure PE-g-Pitch (A) polymeric pitch copolymer contains about 1/1 weight ratio between PE backbone and PAH (pitch) side groups.

The chemical routes for the preparation of the PE-g-Pitch (A) based CF precursors may further comprise an extraction step, wherein the extraction step involves the washing of the resulting PE-g-Pitch (A) copolymer and free pitch mixture with a solvent after their respective reactions are finished. In preferred embodiments the solvent is toluene.

The washing step of the copolymers and polymer chains may not be performed, may be performed about 3 times, may be performed about 5 times, may be performed about 10 times, may be performed about 13 times, may be performed more than 20 times and may be performed a number of times between 0 and 20.

In preferred embodiments, the washing step may be performed any number of times until the solvent after washing becomes colorless.

In other embodiments, the preparation of CF precursors may result in PE-g-Pitch (A) polymeric pitch copolymers that do not possess free pitch molecules. In other embodiments the resulting polymeric pitch copolymers may include 20% to 80%, 30% to 70% or 40% to 60% free pitch molecules.

The preparation of the CF precursors may include, but are not limited to, the following washing steps and resulting PE-g-Pitch (A)/free Pitch mixtures detailed in Table 3.

TABLE 3

Summary of several PE-g-Pitch (A) polymeric pitch copolymers containing various percentages of free pitch molecules after various Soxhlet solvent extraction cycles.

| Run | Solvent extraction cycles | Remaining weight (%) | Carbon fiber precursors | |
|---|---|---|---|---|
| | | | PE-g-Pitch (A) Copolymer (Wt. %) | Free Pitch (Wt. %) |
| C-1 | 0 | 100 | 21 | 79 |
| C-2 | 3 | 56 | 37 | 63 |
| C-3 | 5 | 50 | 42 | 58 |
| C-4 | 10 | 36 | 60 | 40 |
| C-5 | 13 | 29 | 73 | 27 |
| C-6 | >20 | 21 | 100 | Un-detectable |

Figure 6:
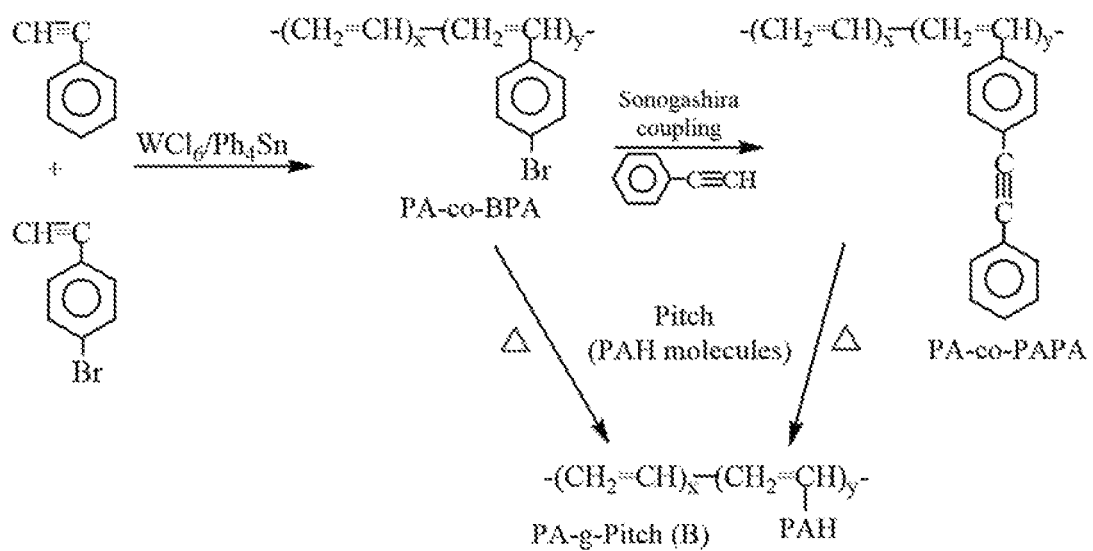
FIG. 6 illustrates a chemical route for the preparation of two representative PA copolymer chains, wherein the polymer chains comprise either a PA-co-BS structure with 4-bromostyrene comonomer units which may undergo a Sonogashira cross-coupling reaction to produce another polymer chain comprising diphenylacetylene side groups (PA-co-DPA). Both reactive PA copolymers can engage in a thermally-induced grafting reaction with PAH molecules to form PA-g-Pitch (B) precursor.

FIG. 6 illustrates a chemical route for the preparation of two representative reactive poly(phenylacetylene) polymer chains, wherein the polymer chains comprise either a PA-co-BPA copolymer structure with 4-bromophenylacetylene comonomer units which may undergo a Sonogashira cross-coupling reaction with phenylacetylene to produce another polymer chain comprising diphenylacetylene side groups (PA-co-PAPA copolymer structure). The first step of the copolymerization reaction between phenylacetylene (PA) and 4-bromophenylacetylene (BPA) to form the PA-co-BPA copolymer chain is very effective when a WCl$_6$/Ph$_4$Sn catalyst system is used. The weight-average molecular weight of polymer chain may be in a range between 30,000 and 2,000,000 g/mol, preferably between 50,000 and 1,000,000 g/mol, and most preferably, between 100,000 and 500,000 g/mol. The polydispersity index of polymer chain (E) may be between 1.5 and 20, preferably between 2 and 10, and most preferably between 2 and 5. The mole ration of [PA]/[BPA] in polymer chain (E) may be from 0/100 to 0/100. The Sonogashira coupling reaction was catalyzed by a mixed Pd(PPh$_3$)$_4$/CuCl/N(C$_2$H$_5$)$_3$ catalyst system in DMF solution under mild reaction condition. Based on $^1$H and $^{13}$C NMR spectra, examining the samples before and after this coupling reaction, the Sonogashira reaction was almost quantitative in forming the corresponding PA-co-PAPA polymer chains.

Figure 14:
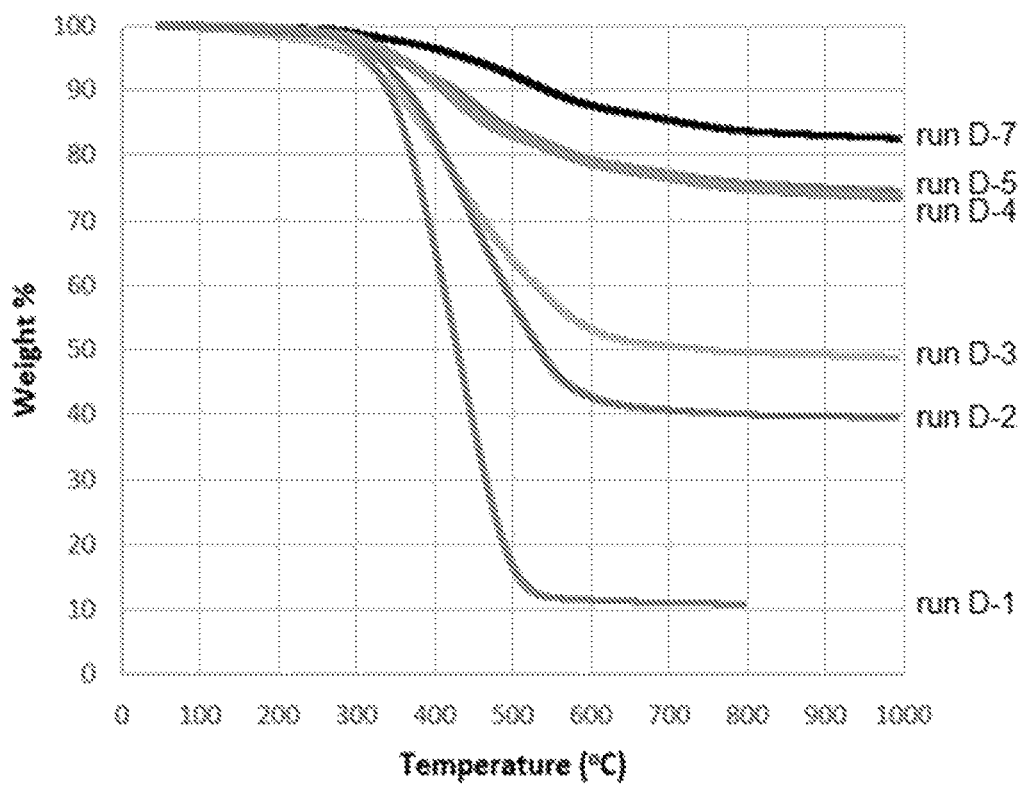
FIG. 14 illustrates the TGA curves of several PA-co-PAPA copolymer fibers and two homopolymer fibers consisting of only PA homopolymer or PAPA homopolymer with a heating rate of 10° C./min under $N_2$.

The chemical route for the preparation of PA-co-BPA polymer chains comprising 4-bromophenylacetylene (BPA) comonomer units may further comprises other reaction conditions. The reaction conditions may include, but are not limited to, those disclosed in Table 4. The C-yields were measured on the corresponding PA-co-PAPA copolymers and two PA and PAPA homopolymers using TGA technique with a heating rate of 10° C./min to 1000° C. The copolymers with high PAPA content (runs D-4, D-5, D-6, and D-7) show very high (>70%) C-yields (FIG. 14).

TABLE 4

Summary of reaction conditions and results in the preparation of PA-co-BPA copolymers and PA-co-PAPA copolymers after Sonogashira coupling reaction.

| | Copolymerization Condition | | | Copolymer results | | |
|---|---|---|---|---|---|---|
| Run | Catalyst* (mM) | PA/BPA [M]/[M] | Temp/ Time (° C./hour) | Polymer yield (%) | BPA content (mol %) | C-yield** (%) |
| D-1 | 80 | 4.0/0 | 0/12 | 87 | 0 | 10 |
| D-2 | 20 | 2.5/0.5 | 0/12 | 90 | 15 | 40 |
| D-3 | 20 | 2.0/1.0 | 0/12 | 88 | 32 | 49 |
| D-4 | 20 | 1.5/1.5 | 0/12 | 85 | 64 | 73 |
| D-5 | 20 | 1.0/2.0 | 0/12 | 88 | 75 | 74 |
| D-6 | 20 | 0.3/1.4 | 0/12 | 83 | 89 | 78 |
| D-7 | 20 | 0/2.0 | 0/12 | 86 | 100 | 82 |

*Catalyst: WCl$_6$/Ph$_4$Sn catalyst system with mole ratio: 1/1.
**TGA measurement with 10° C./min from 20° C. to 1000° C. on PA-co-PAPA copolymers.

In preferred embodiments, both PA-co-BPA and PA-co-PAPA polymer chains can engage in a facile thermal-induced coupling reaction with PAH molecules by under relatively low pyrolysis temperature conditions (<350° C.) in an inert N$_2$ atmosphere. In preferred embodiments, the coupling reaction occurs without any external reagent, to form the corresponding PA-g-Pitch (B) polymeric pitch copolymers.

Figure 7:
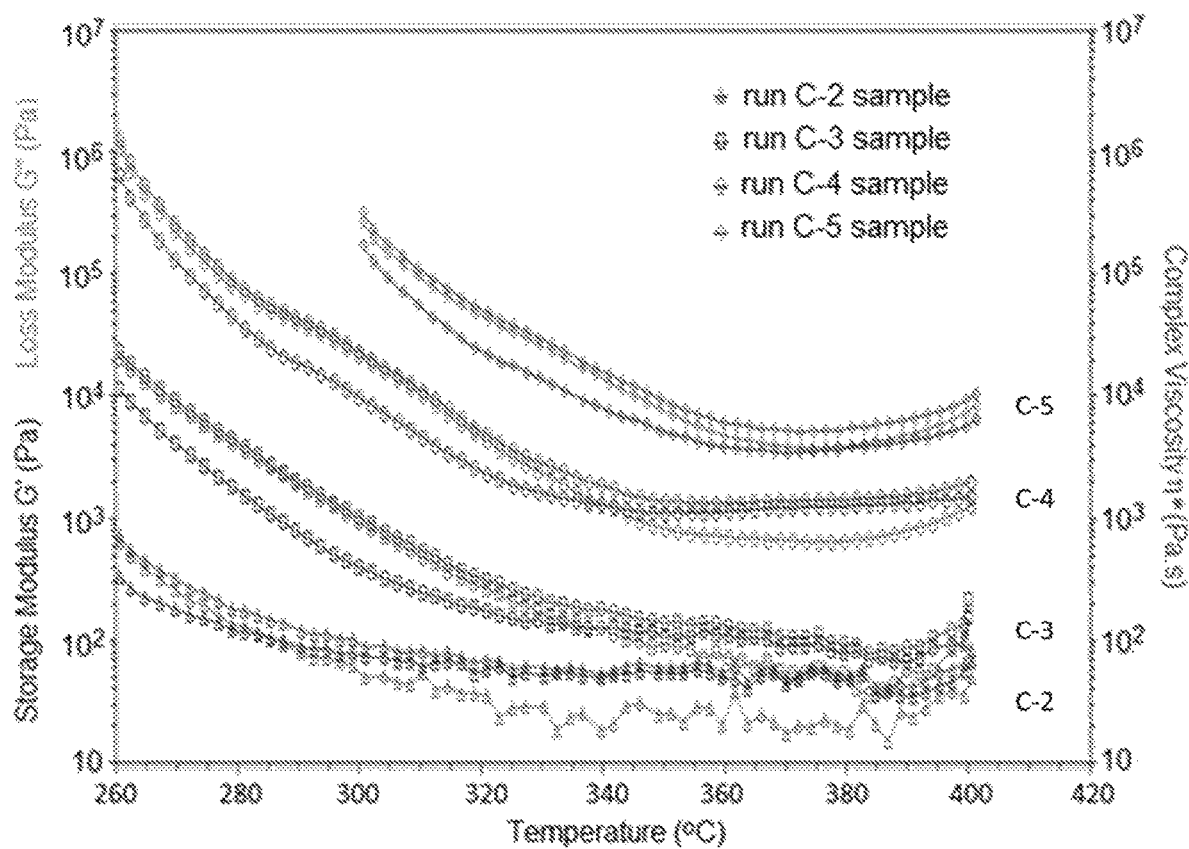
FIG. 7 illustrates rheology curves, including G' and G" values and complex viscosity η* values, for four polymeric pitch copolymers with various free Pitch contents.

FIG. 7 illustrates rheology curves, including G' and G" values and complex viscosity η* values, for four polymeric pitch copolymers with various free Pitch contents (Samples from runs C-2 to run C-5 in Table 3). Oscillation rheology measurement offers a reliable method to identify the suitable melt-processing window. Sample C-1 (containing 21 wt % polymeric pitch copolymer and 79 wt. % free pitch molecules) shows a very low melt viscosity. This copolymer thus has difficultly in forming the continuous fibers that exhibit low tensile strength. On the other hand, pure polymeric pitch copolymer (run C-6) shows a very high melt-viscosity >10$^5$ PA·s, which is over the acceptable range for common fiber melt-spinning processes. However, this copolymer is very soluble in common organic solvents (such as toluene) and can be easily processed by solution fiber-spinning techniques, including electro-spinning process that produces the desirable microfibers by electric force. As shown in Table 3, samples from runs C-2 to C-5 contain various percentages of free Pitch molecules that serve as a plasticizer. They are suitable for melt-spinning processes to form PE-g-Pitch (A) based precursor fibers.

In some embodiments, the suitable melt-processing window is determined with a single-filament melt-spinning apparatus that possesses a steady melt viscosity. The steady melt viscosity may be <5000 Pa·s.

The melt-spinning apparatus may include an extrusion unit (on top), a spinneret (connected to extrusion unit) with a die diameter of 0.1 mm (100 mm), and/or a take-up unit (at bottom).

In some embodiments, the suitable melt-processing window is determine at a temperature below the G'(ω) and G"(ω) crossover point of the polymeric pitch copolymer.

In some embodiments, the polymeric precursors may be melt-extruded into filaments by a melt-spinning apparatus. In preferred embodiments, the melt-extruded filament is solidified in air and collected on a take-up wheel with variable speed. Applicants have discovered that an increase in the take-up speed leads to a reduction in filament diameter, an increase in polymer chain orientation and possibly an increase in mechanical properties.

Figure 8:
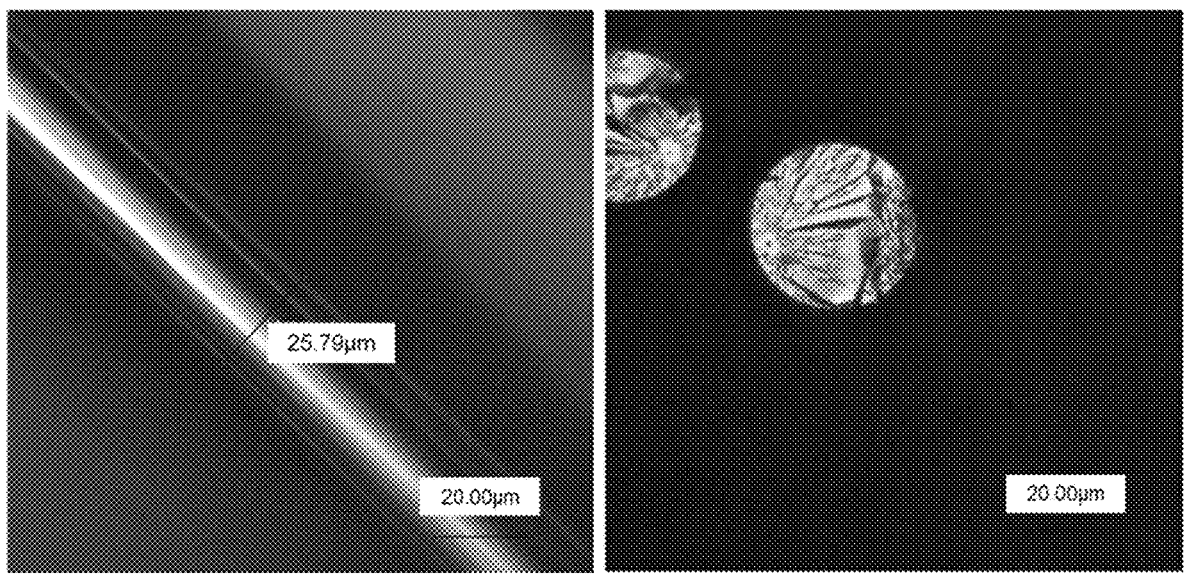
FIG. 8 shows a SEM (Scanning Electron Micrograph) of a melt-spun CF precursor fiber, which contains 60 wt. % of a polymeric pitch copolymer PE-g-Pitch (A) and 40 wt. % of free pitch molecules.

FIG. 8 shows a SEM (Scanning Electron Micrograph) of a resulting melt-spinning fiber from run C-4 sample (Table 3), which contains 60 wt. % of PE-g-Pitch (A) polymeric pitch copolymer and 40 wt. % of free pitch molecules. This resulting CF fiber exhibits very smooth surfaces and a uniform fiber diameter ~25 um. The cross-section of this fiber also shows no detectable voids and a highly crystalline morphology.

The PE-g-Pitch (A) polymeric pitch copolymers or mixtures of polymeric pitch copolymers with free pitch molecules may be processed by solution fiber-spinning techniques, such as electro-spinning process, which produce desirable microfibers by electric force.

Figure 9:
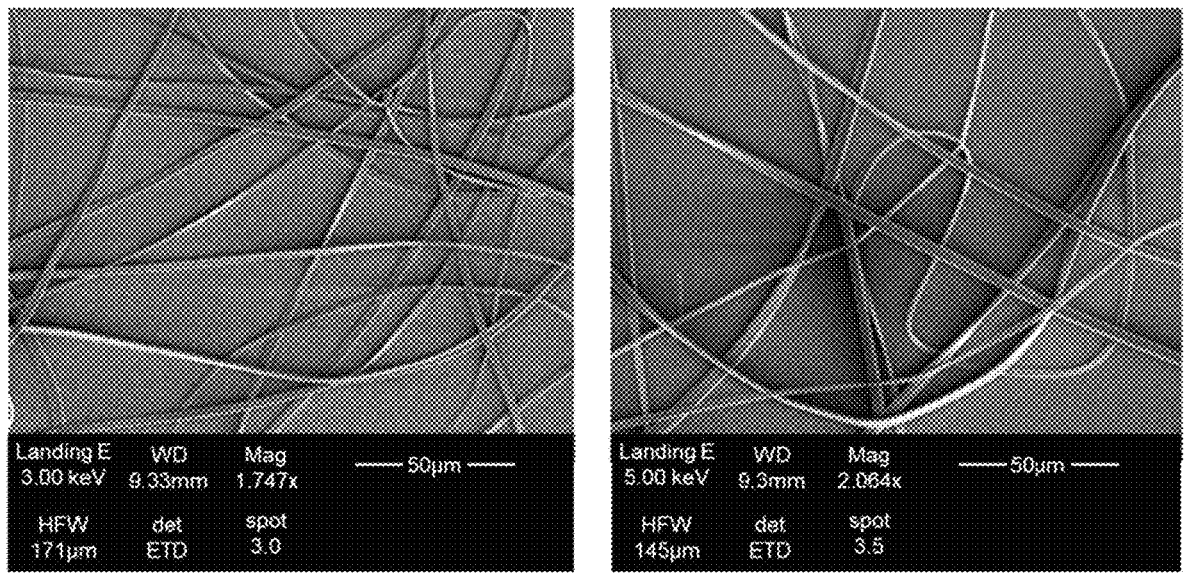
FIG. 9 shows SEM micrographs of two electro-spun PE-g-Pitch (A) CF precursor fibers.

FIG. 9 shows SEM micrographs of two electro-spun CF precursor fibers from pure PE-g-Pitch polymeric pitch copolymer (run C-6 in Table 3). Both microfibers are long and continuous with uniform diameter and smooth surfaces. The fiber diameter (<10 μm) also can be controlled by polymer concentration. The higher the polymer concentration the larger the fiber diameter under the same operation parameters.

Figure 10:
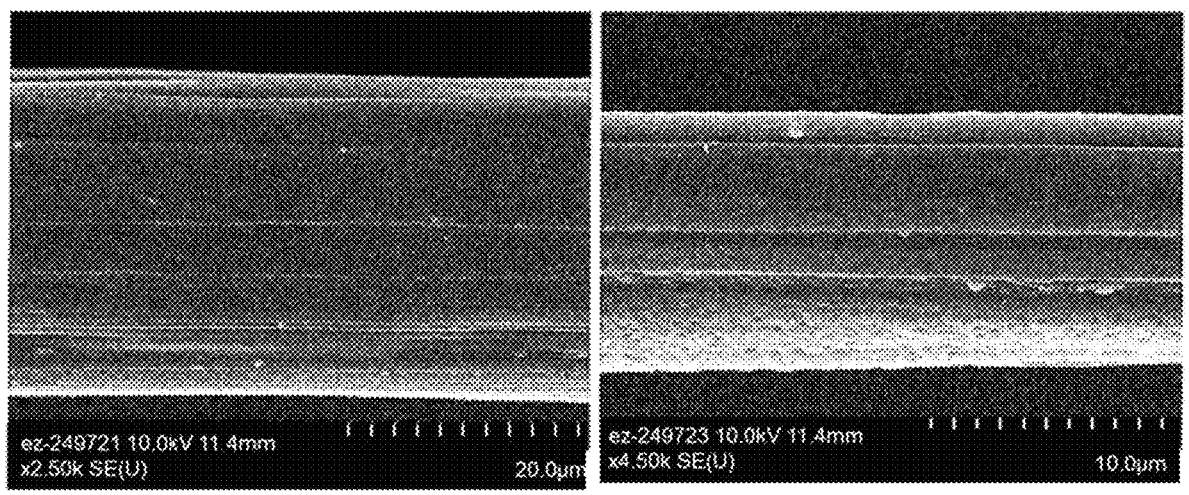
FIG. 10 shows SEM micrographs of the surfaces of two melt-spun single CF precursor fibers.

FIG. 10 shows SEM micrographs of two CF precursor fibers prepared from melt-spinning of a PE-g-Pitch (A)/free Pitch mixture. The mixture was directly prepared by mixing PE-co-DVB reactive copolymer with PAH molecules (Pitch), with 1/10 weight ratio, at 200° C. for 1 hour before melt-spinning at 340-350° C. Despite using a large diameter outlet (~800 μm), these fibers were able to be drawn down to 10-20 μm. These fibers have a typical striated surface but are approximately circular in nature.

The PAPA homopolymer and PA-co-PAPA copolymers are very soluble in common organic solvents, such as toluene and tetrahydrofuran (THF). They may be used to form polymer fibers via various wet-spinning processes. These polymer chains by themselves can exhibit high C-yields, especially the PAPA homopolymers. The combination of high C-yield and fiber spinning capability offers an excellent potential to be a useful CF precursor system.

Figure 11:
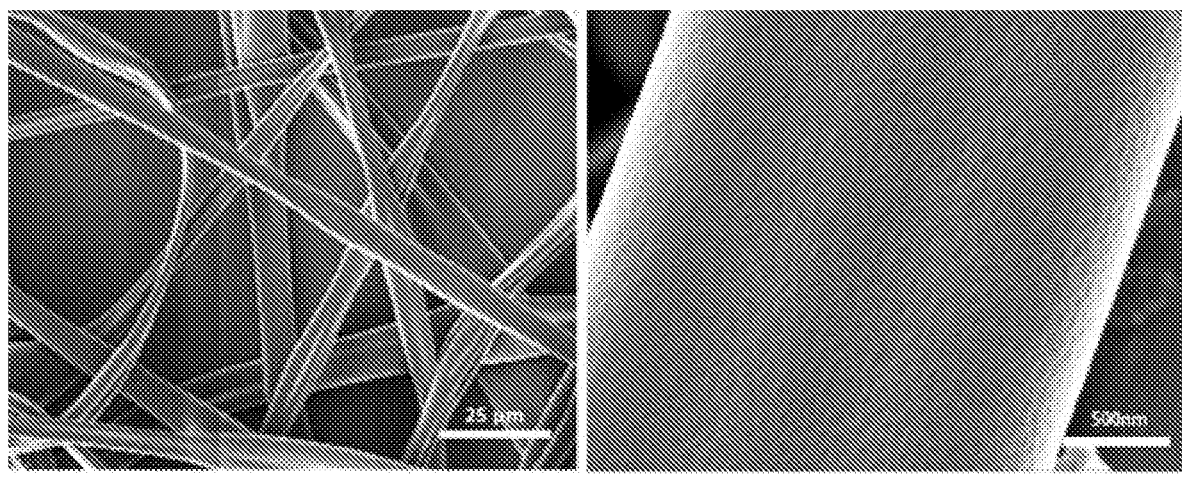
FIG. 11 shows SEM micrographs of the electro-spun PAPA polymer fiber.

FIG. 11 shows SEM micrographs of the electro-spun PAPA homopolymer fiber with an ~5 μm diameter, which was prepared from a 30 wt % PAPA polymer solution in THF (tetrahydrofuran). The relatively uniform fibers imply a high polymer molecular weight, which is consistent with the GPC-light scattering result (Mw ~300 k g/mol).

Figure 12:
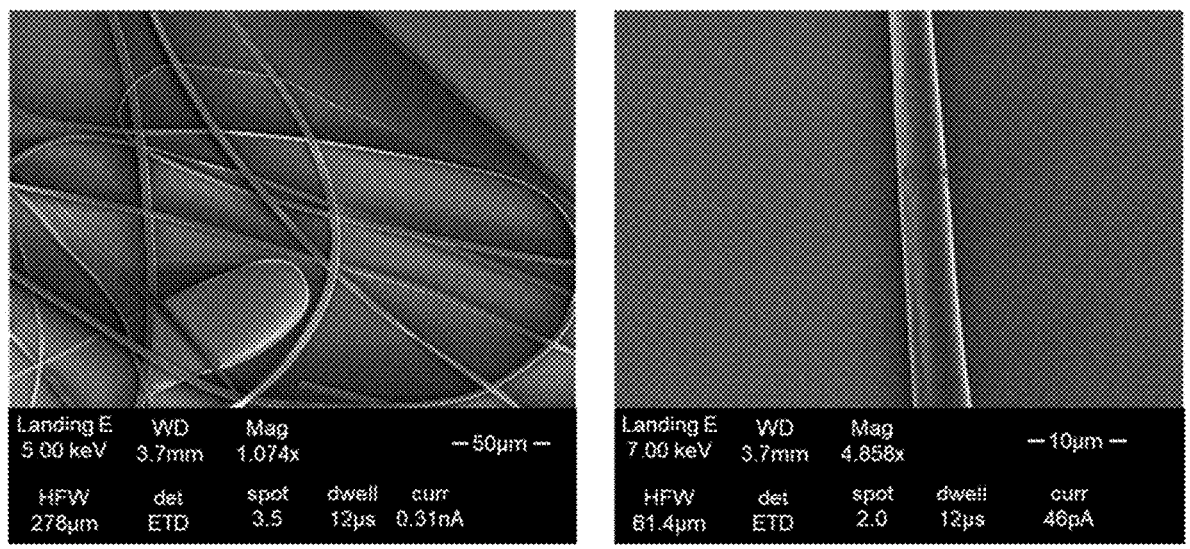
FIG. 12 shows SEM micrographs of the electro-spun PA-co-PAPA copolymer fiber.

FIG. 12 shows SEM micrographs of the electro-spun PA-co-PAPA copolymer fiber with an ~5 μm diameter, which was prepared from a 30 wt % PAPA polymer solution in THF (tetrahydrofuran). The relatively uniform fibers imply a moderate polymer molecular weight, which is consistent with the GPC-light scattering result (Mw ~500 k g/mol).

Another aspect of the present invention includes a new thermal conversion process (stabilization and carbonization) to convert the fabricated fibers fabricated from reactive copolymers, polymeric pitch copolymers or mixtures of polymeric pitch copolymers with free pitch molecules, into their corresponding CF products. This conversion process may involve a one-step thermal heating process at the temperature range from 1000 to 2500° C. under an inert atmosphere. The current transformation process for both PAN and pitch precursors requires two distinctive reaction steps, including (i) stabilization under low temperature heating (up to 300° C.) in air (oxygen) and (ii) carbonization under an inert atmosphere (from 700 to 2500° C.).

In one embodiment, the thermal conversion process comprises both the stabilization and carbonization steps. In preferred embodiments, both steps are based on the same facile thermal-induced coupling reaction between π-electron rich moieties and do not require oxygen for the crosslinking or oligomerization reactions during the stabilization step.

In another embodiment, the carbonization step occurs at 1500° C. under a $N_2$ atmosphere.

In one embodiment, the carbonization step occurs at 2100° C. under $N_2$ atmosphere.

In one embodiment, the thermal conversion process produces CF products with a C atom content >96%.

Figure 13:
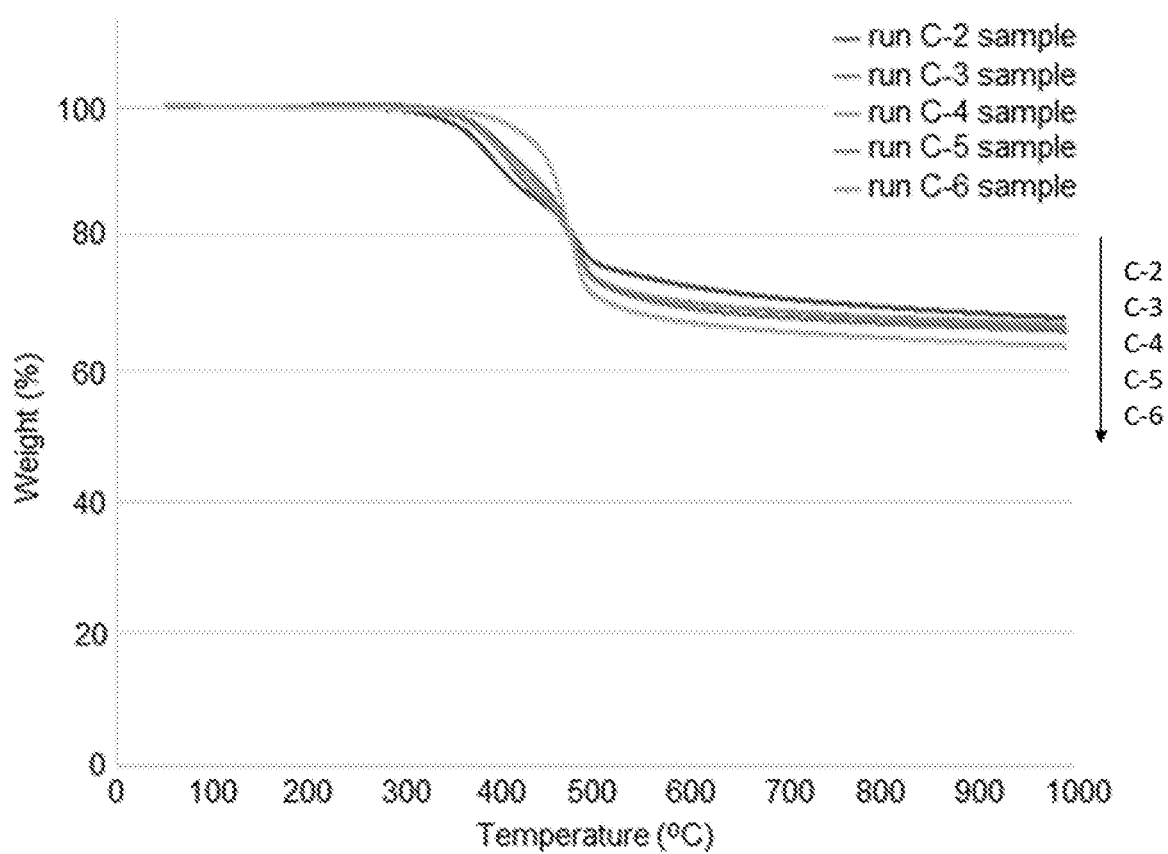
FIG. 13 compares TGA curves for several PE-g-Pitch (A)/Pitch precursor fibers from samples C-2 to C-6 in Table 3 with a heating rate of 10° C./min under $N_2$.

FIG. 13 compares TGA curves for the precursor fibers from samples C-2 to C-6 in Table 3 with a heating rate of 10° C./min under $N_2$. It was somewhat unexpected to observe similar C-yield (in the range of 63 to 67 wt. %) for all samples, despite that they contain a wide range of free Pitch molecules from 0 wt. % (i.e. C-6) to 63 wt. % (C-2). The starting polymer chain does not offer any measurable C-yield and the corresponding Pitch resin only produces 50% C-yield. It is remarkable to observe 63 wt % C-yield for a pure polymeric pitch copolymer, which is significantly higher than commercial PAN polymer precursors with ~50 wt. % C-yield. In addition, the mixtures between polymeric pitch copolymers and free Pitch molecules (Samples C-2 to C-5) all exhibit even higher C-yields, with a trend that a higher free Pitch content yields a higher C-yield. Evidently, the polymeric pitch copolymers and mixtures of polymeric pitch copolymers with free Pitch molecules play a key role in the carbonization process. Without being bound by any particular theory, it is believed that during the carbonization step, the PE-g-Pitch polymer can offer pitch molecules the anchor sites by coupling reaction between the grafted pitch molecule in the polymer and free Pitch molecule to prevent evaporation, thus increasing the overall C-yield. On the other hand, the incorporated polyaromatic side groups from pitch may enhance the de-hydrogenation activity (with the reduced activation energy) in the PE polymer by forming longer and stronger π-electron conjugated polymer structures. In other words, they may also actively engage in the stabilization reaction during the ring-fusion reactions between the copolymer side groups and free Pitch molecules, as well as during the crosslinking reaction between two copolymer side groups. This complemental effect may be essential in designing polymer-based CF precursors.

FIG. 14 compares TGA curves for the precursor fibers from several PA-co-PAPA copolymers and two PA and PAPA homopolymers in Table 4 with a heating rate of 10° C./min under $N_2$. The PA homopolymer (run D-1) with only phenyl side groups is not sufficiently reactive to engage any meaningful low temperature stabilization reactions. This polymer losses most of its weight in a range between 300 and 500° C., resulting in only 10% C-yield at 800° C. On the other hand, all PA-co-PAPA polymer chains show higher C-yields and the C-yield is proportional to [PAPA] comonomer content. In the case of the poly (PAPA) homopolymer (run D-7), the C-yield reaches to >80%, much higher than the 50% shown in PAN precursor. Evidently, the additional phenylacetylene moiety along the poly(PA) chain dramatically increases its stabilization activities in the low temperature range (<300° C.), which may involve an inter- and intra-chain [2+4] cycloaddition reaction between triple bond and aromatic moieties without weight loss. These cycloaddition reactions increase its aromaticity and form crosslinking structures essential to the subsequent carbon conversion. Without the presence of O and N heteroatoms in the precursor, the carbonization process only involves the elimination of H atoms and ring fusion, which is much more efficient in forming 2-D graphene structures. The higher carbonization temperature further promotes ring fusion and chain diffusion to form larger graphene sheets in the resulting C material.

Figure 15:
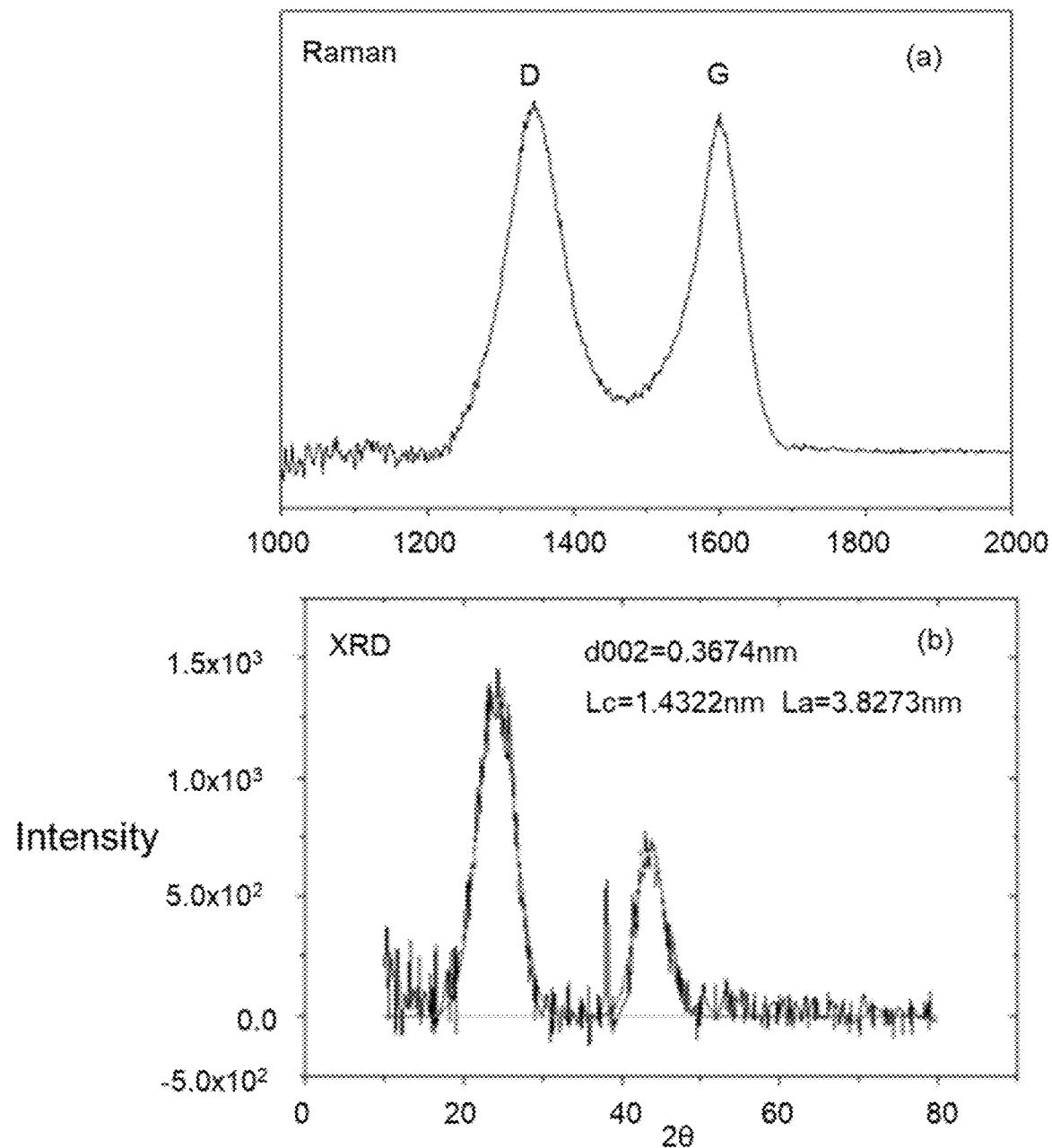
FIG. 15 illustrates Raman spectrum and XRD pattern for the resulting carbon fiber converted from the melt-spun precursor fiber containing a polymeric pitch copolymer PE-g-Pitch (A) with 40 wt. % of free Pitch molecules (Sample C-4) after heating at 1500° C. for 1 h under $N_2$ during a thermal conversion process.

FIG. 15 illustrates Raman spectrum and XRD pattern for the carbon fiber (CF) after heating the melt-spun fiber from run C-4 sample (Table 3) at 1500° C. for 1 h under $N_2$ during a thermal conversion process, which contains 60 wt. % of PE-g-Pitch (A) polymeric pitch copolymer and 40 wt. % of free pitch molecules. FIG. 15 (a) shows a Raman spectrum of CF from a polymeric pitch copolymer (Sample C-4). There are two characteristic peaks indicating two different chemical structures; the D band near 1334 $cm^{-1}$ indicates a disordered amorphous C structure, and the G band near 1600 $cm^{-1}$ indicates an order graphitic structure. Their peak intensity ratio $R=I_D/I_G$ ($I_D$ and $I_G$ represent integral intensities of the D and G peaks, respectively) is used to calculate the relative content of $sp^2$ hybrid carbon atoms in the order graphitic structure of carbon fiber, which is the degree of graphitization. Both order G band and disorder D band are clearly observed in all carbon fiber samples and are independent on the excitation wavelength. It was surprising to discover similar Raman spectra for all CF products (precursor fibers from runs C-2 to C-6), which contain a pure polymeric pitch copolymer and polymeric pitch copolymers containing free pitch molecules. The integrated intensity ratio (R) for the D and G bands is inversely proportional to the carbonization temperature, which reaches to 1.3 after heating at 1500° C. for 1 hour under $N_2$ atmosphere. This R value is close to the values shown in many PAN-based carbon fibers. In addition, the trend of R value is inversely proportional to the carbonization temperature. It was expected that the R value of polymeric pitch copolymer-based CF precursors would have further decreased with the increase of heating temperature >1500° C. or increasing the heating time. The observation of crystalline C domains was further confirmed and quantified by X-ray diffraction (XRD) measurements. Since the wide-angle diffraction patterns have coherence zones with minimum length between 1 and 2 nm, the XRD pattern reflects only the sizes and layer distances of the best ordered domains. FIG. 15 (b) shows the same carbon fiber prepared at 1500° C. for 1 h under $N_2$ atmosphere. Two distinctive x-ray peaks at 2θ~24 (002) and ~43 (100) are the signature of C crystallites. The peak parameters can be used to calculate the crystallite size in the carbon fiber, with La=3.8273 nm, Lc=1.4322 nm, $d_{002}$=0.3674 nm. These crystal lattice parameters are like the reported numbers for PAN-based carbon fibers prepared at 1500° C. They are particularly close to those (La=3.9 nm, Lc=1.3 nm, $d_{002}$=0.364 nm) of high strength PAN-based carbon fibers.

Figure 16:
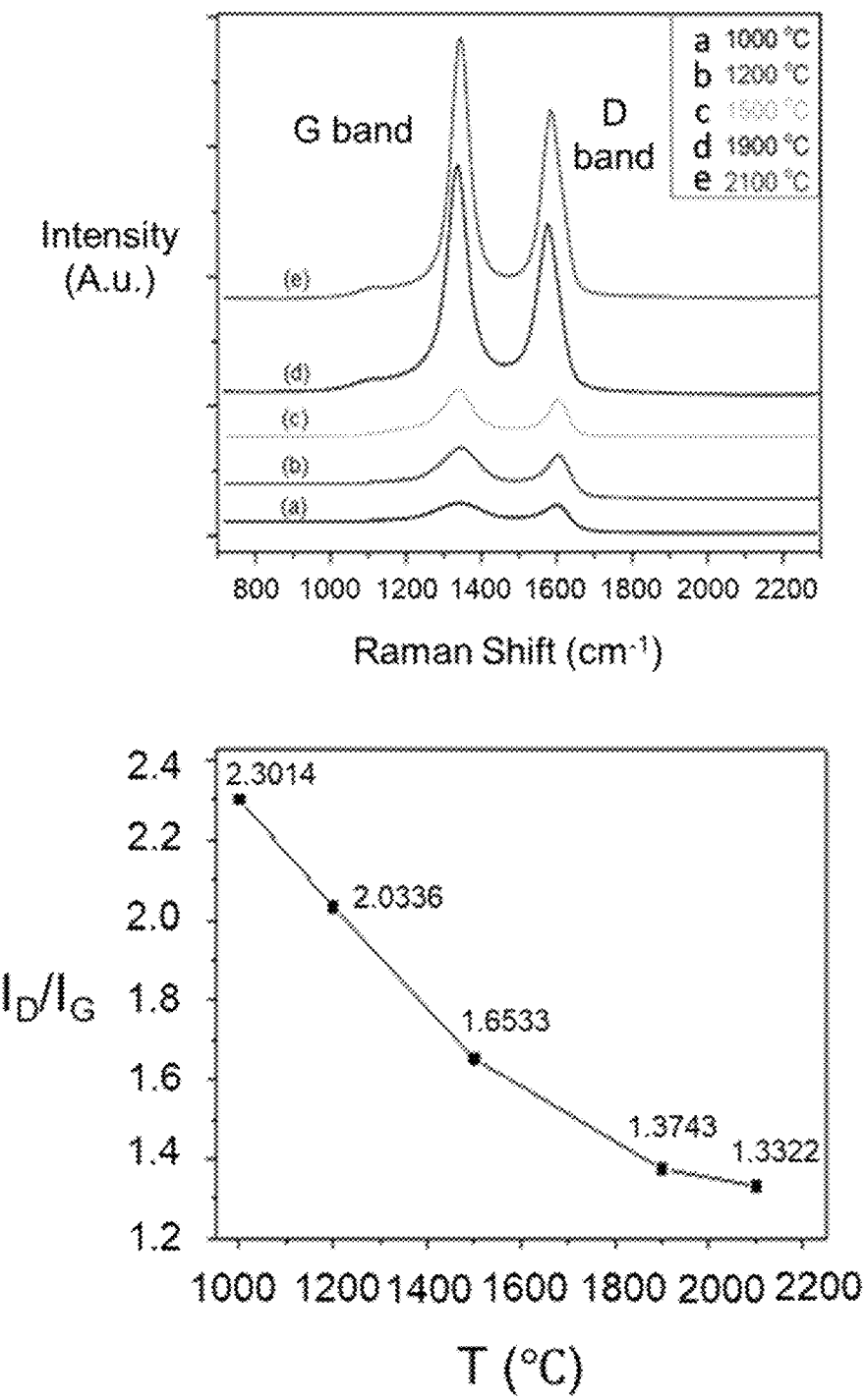
FIG. 16 depicts Raman spectroscopy data of a resulting carbon fiber converted from the electron-spun PAPA homopolymer fiber after heating at 1500° C. for 1 h under $N_2$ during a thermal conversion process.

FIG. 16 depicts Raman spectroscopy data of CF products after thermal treatment of the electro-spun PAPA homopolymer fiber from run D-7 sample (Table 4). FIG. 16 (left) shows the Raman spectra of several resulting CFs using a laser excitation wavelength at 514.5 nm. The CFs were prepared by thermal treatment of the same PAPA homopolymer fiber at 1000, 1200, 1500, 1900, and 2100° C. for 1 hour under $N_2$ atmosphere, respectively. Both the order G band at 1582 $cm^{-1}$ and the disorder-induced D band at 1350 $cm^{-1}$ of C structures are clearly observed, indicating a polymorphous morphology. FIG. 16 (right) shows the integrated intensity ratio ($I_D/I_G$) for the D and G bands to determine their order/disorder ratios, which is inversely proportional to the carbonization temperature and reaches to 1.33 for the CF after heating at a temperature of 2100° C. Overall, the trend of this $I_D/I_G$ intensity ratio is similar to PAN-based carbon fibers with the continuous reduction of $I_D/I_G$ ratio and increase of crystalline domains with higher heat treatment temperature. This polymorphous morphology contains some relatively ordered graphene layer structures that are embedded in a more disorder isotropic region. The slightly less order domain structure, comparing to some PAN based carbon fibers, may be associated with the lack of mechanical stretching that can facilitate chain motion and orientation.

Figure 17:
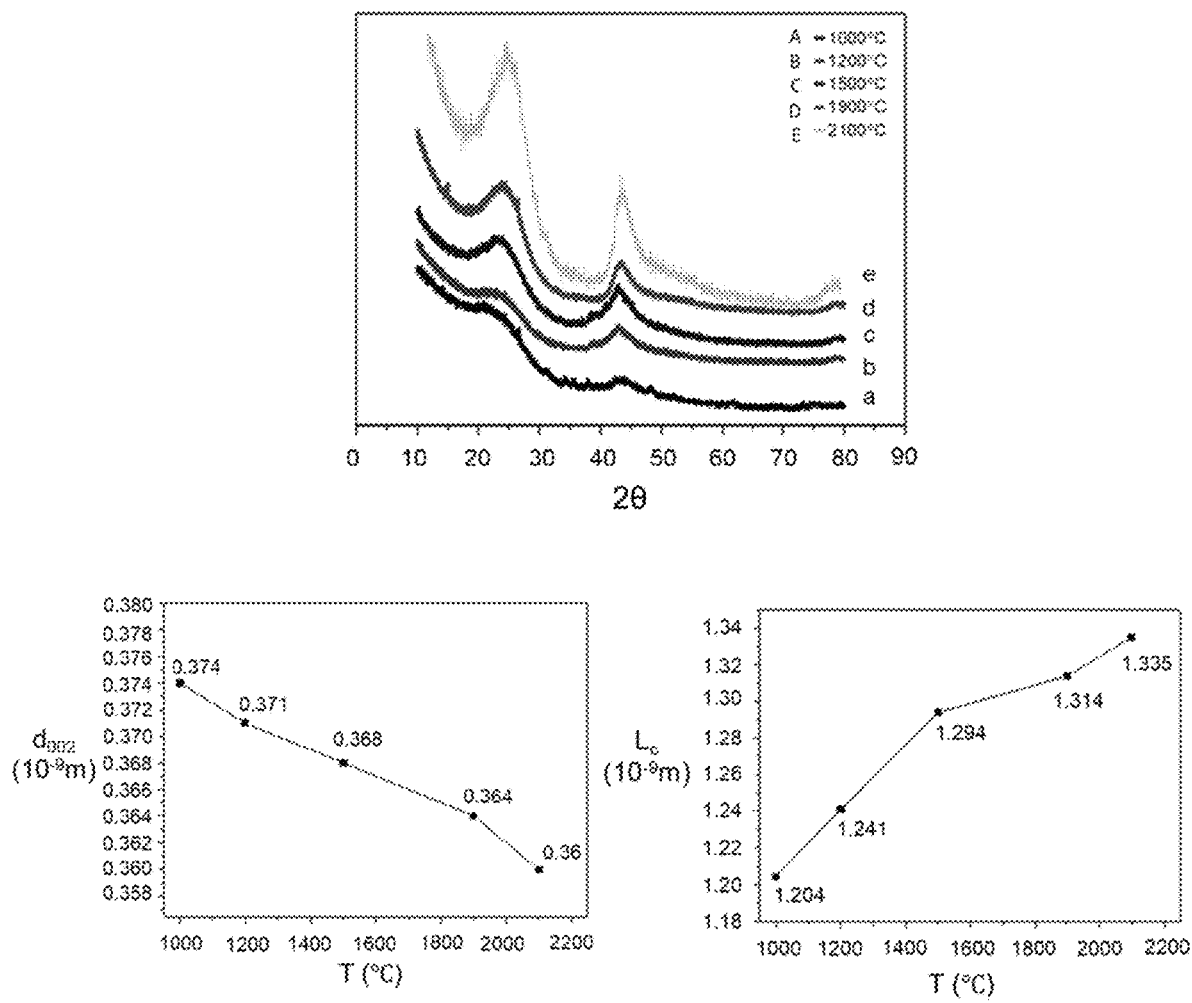
FIG. 17 depicts XRD patterns of several carbon fiber products (top) and their interlayer d-spacing ($d_{002}$) and stacking height ($L_c$) (bottom).

FIG. 17 (top) depicts XRD patterns of the same set of CF products after thermal treatment of the electro-spun PAPA homopolymer fiber (run D-7 sample) at 1000, 1200, 1500, 1900, and 2100° C. for 1 hour under $N_2$ atmosphere, respectively. FIG. 17 (bottom) depicts their interlayer d-spacing ($d_{002}$) and (c) stacking height ($L_c$). Since the wide-angle diffraction patterns have coherence zones with minimum length between 1 and 2 nm, the XRD pattern reflects only the sizes and layer distances of the best ordered domains. The interlayer d-spacing ($d_{002}$) and the stacking height ($L_c$) in crystalline domains of carbon fibers show two distinctive x-ray peaks at 2q ~24 (002) and ~43 (100) are the signature of graphene crystallites, which start to appear at 1000° C. and grow with an increase in temperature. The peak parameters were used to calculate the crystallite size, the carbon fiber treated at 2100° C. exhibited $d_{002}$=0.360 nm and Lc=1.335 nm, These values are highly similar to those ($d_{002}$=0.364 nm and Lc=1.3 nm) of high strength PAN-based carbon fiber.

The thermal conversion processes of the present invention for CF precursor development offer unique combinations of advantages, such as low cost (scalable) precursors, efficient fiber melt-spinning processes to form stronger precursor CF fibers with desirable fiber diameters, high C-yields, and in situ drawings (mechanical tension) throughout the entire production process of forming high-quality CF end products.

The polymeric pitch copolymers or mixtures of polymeric pitch copolymers with free pitch molecules, which exhibit high melt strength, may be melt-spun into fibers and then subsequently undergo carbonization under mechanical drawing (tension) conditions.

EXAMPLES

Example 1: Materials Handling and Characterization

The following chemical reagents, including phenylacetylene, diisopropylamine, CuI, Bis(triphenylphosphine) palladium(II) dichloride, [(C$_5$Me$_4$)SiMe$_2$N(t-Bu)]TiCl$_2$, tungsten hexachloride (WCl$_6$), tetraphenyl tin (Ph$_4$Sn), 4-bromophenylethynyl, (triisopropylsilyl)acetylene, trimethylsilyl acetylene, tetrahydrofuran, tetrabutylammonium fluoride trihydrate (TBAF) in THF (1M), triethylamine, calcium hydride, and petroleum Pitch (softening temperature 250° C.) were used as received. 4-Bromostyrene was vacuum distilled after drying overnight by CaH$_2$. MMAO-12 7% toluene solution was dried by vacuum at 50° C. to become white powders. THF and toluene were purified via the Grubbs type solvent purification system.

$^1$H NMR and $^{13}$C NMR spectra were obtained by using Bruker AV 300 spectrometer. For a typical $^1$H NMR measurement, 10 mg of sample was completely dissolved by 1 ml of d-1,1,2,2-tetrachloroethane at 90° C. in a thin wall NMR sample tube, while in the $^{13}$C NMR measurement, 30 mg of sample was dissolved in 1 ml of the same type of deuterated solvent. TGA measurement was conducted on a Sdt-600 (TA Instruments). Around 10 mg of sample was loaded into the sample pan and heated in a rate of 10° C./min in certain atmosphere. Rheology measurement was conducted on ARES-G2 (TA instruments) in N$_2$ atmosphere with heating rate of 10° C./min. The angular frequency was 1 rad/s and strain was 10%. All samples were pre-molded with diameter of 8 mm and thickness of ~1.5 mm by using vacuum hot press. XRD measurements were conducted on a Panalytical Pro MPD Diffractometer from Malvern at 40 kV and 40 mA with Cu K(α) radiation λ=0.15418 nm. Diffraction patterns were recorded on a 0.8 collimator, with an oscillation of the samples between 10 and 80° and an imaging plate detector. The scan rate was 0.2°/min with an interval of 0.045°. The interlayer distance d002 was calculated using the position of the 002-reflection and Bragg's equation. The crystallite thickness Lc was determined with the (002) reflection and Scherrer's equation while the lateral size La was determined using the (110) reflection and Scherrer's equation.

Example 2: Synthesis of PE-Co-BS Copolymers

The copolymerization reaction between ethylene and 4-bromostyrene (BS) comonomer was conducted in a 500 ml stainless autoclave equipped with mechanical stirrer. In a typical reaction, the reactor was firstly charged with 220 ml of toluene, certain amount of 4-bromostyrene and 30 ml of MMAO-12 (7 wt % in toluene) with argon protected and stirring. Then the reactor was filled with ethylene at 50 psi and heated to 40° C. After 10 minutes, 1 ml of [(C$_5$Me$_4$)SiMe$_2$N(t-Bu)] TiCl$_2$ (20 umol/ml) was injected into the reactor to initiate the reaction. After 1 hour, ethylene was replaced by Argon and the reaction was terminated by adding 30 ml of isopropanol. The solution mixture was then poured into 600 ml of diluted HCl solution with methanol. The resulting PE-co-BS copolymer was isolated by filtration and was washed with 200 ml of methanol three times before drying in a vacuum oven overnight at 60° C., as shown in Table 2.

Example 3: Synthesis of PE-co-DPA Copolymers

In a typical reaction, 5 g of PE-co-BS copolymer from Example 2 was dissolved in 230 ml of toluene in a 500 ml three neck round bottom flask with a condenser under 90° C. in nitrogen atmosphere. Then, 0.1 g of CuI, 0.265 g of bis(triphenylphosphine) palladium (II) dichloride, and 3.3 ml of phenylacetylene were added into the flask. The reaction was initiated by adding 4.2 ml of diisopropylamine drop-wisely by using a dropping funnel. After 96 hours, the solution mixture was poured into 600 ml of methanol with vigorous stirring. The polymer product was dissolved in toluene and precipitate in methanol until the liquid become colorless.

Examples 4: Preparation of PE-g-Pitch (A) Precursors

In a typical example, 2 g of PE-co-BS copolymer from Example 2 and 20 g of pitch resin were premixed in a 500 ml beaker to become a uniform mixture. Mechanical blending of the premixed sample was then conducted in a twin-screw brabender. This system has three thermocouples located at outer cover, sample chamber and inner wall to have a close monitor on temperature control. The heating rate was set to 10° C./min. Nitrogen flowed in the system through a rubber tube to create an air-free environment during mixing at a flow rate of 100 ml/min. Firstly, the premixed sample was loaded into the sample chamber at room temperature and was mixed at a rate of 100 rpm before the heating started. After the temperature reached 310° C., the sample was heat treated for 1 hour at this temperature with an increased mixing rate of 300 rpm. After it, the sample was cooled down by an air-cooling system with a cooling rate of 5° C./min. After blending, all collected samples were grounded into the power form by a mortar.

Example 5: Free Pitch Removal from PE-g-Pitch (A) Mixture

After reactive blending in Example 4, the Soxhlet extraction set-up was used to remove some unreacted pitch from the PE-g-Pitch (A) mixture. The amount of pitch removed could be controlled by counting the running Soxhlet cycles. The removed pitch percentage (RP %) was calculate by the equation:

$$RP\ \% = \left[1 - \left(\frac{W_f}{W_o}\right)\right] * 100\%$$

where $W_o$ is the original weight of sample before extraction and $W_f$ is the weight of collected product after extraction.

Example 6: Synthesis of PAPA Monomer

The preparation of PAPA (4-phenylethynyl)phenylacetylene monomer involves two reaction steps. The first step is a palladium-catalyzed Stille aryl-acetyl cross-coupling reaction between 4-bromophenylethynyl-trimethylsilane and phenylacetylene to form 1-trimethylsilylethynyl-4-phenylethynyl benzene (intermediate). In a typical reaction, 8.04 g (31.8 mmol) of 4-bromo(trimethylsilyl)acetylene was mixed with 150 mg (1.7 mmol) of Pd(PPh$_3$)$_2$Cl$_2$, and 129 mg (0.9 mmol) of CuI in a 250 mL round bottom flask. The flask was placed under N$_2$ atmosphere before the addition of triethylamine/THF (150 mL) via syringe. The reaction was stirred for 5 min to allow the reagents to dissolve and 5.12 mL (54 mmol) of phenylacetylene was added to the reaction flask. The solution turned dark brown upon the addition of phenylacetylene. The solution was stirred at room temperature for 4 days. After 4 days, the volatiles were removed in vacuo, and the crude product was purified by column chromatography on silica gel with hexane: dichloromethane as the eluant to provide 7.4 g of 1-trimethylsilylethynyl-4-phenylethynyl benzene. $^1$H NMR spectrum shows all the expected chemical shifts for aromatic protons and methyl protons in the silane group and a near 1:1 peak intensity ratio.

In second step of the deprotection reaction, 4.80 g of 1-trimethylsilylethynyl-4-phenylethynyl benzene was dissolved in 45 mL of tetrahydrofuran (THF) solvent in a 100 mL flask, of. Then, 1.6 mL of 1M TBAF/THF solution was slowly added to the solution. The reaction mixture was stirred for 3 hr at ambient temperature. The reaction was quenched with 30 mL of water and extracted with 3×25 mL portions of diether ether. The combined organic fractions were dried over anhydrous $Na_2SO_4$ and the solvents were removed in vacuo. The crude product was purified by column chromatography on silica gel with dichloromethane as the eluant. After drying overnight in air, a yellow powder 2.48 g (70% yield) of PAPA monomer was obtained.

Example 7: Synthesis of PA Homopolymer

In a 50 mL round bottom flask, $WCl_6$ catalyst (80 mM) and $Ph_4Sn$ cocatalyst (80 mM) were dissolved in 12 mL of toluene under $N_2$. After aging for 15 minutes at 0° C., a syringe was used to slowly add 5.27 ml of phenylacetylene to the solution. After 15 minutes of stirring, the viscosity of the solution began to increase. This increase is visualized as the stirring rate became slow with time. The color of the aged dark solution gradually changed from dark black to dark red. The solution was left to stir for 24 hours at 0° C. After 24 h, the solution was extremely viscous with little stirring. The reaction was quenched by the addition of 2-4 ml of isopropyl alcohol to the flask and allowed to stir for few minutes before adding 10 ml of MeOH to participate the polymer out of solution. The product was isolated and purified with MeOH/HCl solution. After drying under vacuum at 80° C., the polymerization yields 4.56 g (86.7%) of fine dark red PA homopolymer.

Example 8: Synthesis of BPA Homopolymer

In a 50 mL round bottom flask under $N_2$ atmosphere, $WCl_6$ catalyst (95 mg, 20 mM) and $Ph_4Sn$ co-catalyst (102.5 mg, 20 mM) were dissolved in 6 mL of toluene. The solution was aged for 15 minutes at 0° C. At the same time (4 g, 22 mmol) of 4-bromophenylacetylene (BPA) was dissolved in 6 mL of toluene in a separate vessel under $N_2$ conditions. A syringe was used to add the mixture to the aged catalyst. The viscosity of the solution increased steadily with increase in time. The color of the aged dark solution gradually changed from dark black to dark red. The solution was left to stir for 12 h at 0° C., the solution became extremely viscous with little stirring. The reaction was quenched by the addition of 2-4 ml of isopropyl alcohol to the flask and allowed to stir for few minutes. Then, 10 ml of MeOH was added to the flask to participate the polymer from solution. The product was isolated and purified with MeOH/HCl solution. After drying under vacuum at 80° C. for overnight, we obtained 3.433 g (85.8%) dark red BPA homopolymer.

Example 9: Synthesis of PAPA Homopolymer

BPA homopolymer obtained in Example 8 was used to prepare PAPA homopolymer. In a 100 ml round bottom flask, BPA homopolymer (2.8 g), 532 mg (0.759 mmol) of $Pd(PPh_3)_2Cl_2$, and (240 mg, 1.01 mmol) of CuI were mixed in 25 ml of THF solvent. After stirring to the complete dissolution, phenylacetylene (6.6 ml) and diisopropylamine (8.4 ml) mixed in a separate flask were added slowly to the 100 ml flask via a syringe. The temperature of the reaction was increased to 60° C. and allowed to stir for 4 days. A gradual change in the color of the solution from dark red to dark brown was observed. After cooling down to ambient temperature, the reaction was quenched by adding 50 ml of water. The entire solution was then poured into 100 ml of methanol. The participated product was isolated and purified to yield 2.656 g (84.55% yield) of dark-brown PAPA homopolymer.

Example 10: Synthesis of PAPA Homopolymer

PAPA homopolymer was also prepared by direct polymerization of PAPA monomer obtained in Example 6. In a 50 mL round bottom flask, $WCl_6$ catalyst (23.7 mg, 10 mM) and $Ph_4Sn$ cocatalyst (25.6 mg, 10 mM) were dissolved in 3 mL of toluene under $N_2$. The solution was aged for 10-15 minutes at 0° C. In another flask, (1.2 g, 5.9 mmol) of PAPA monomer was dissolved in 3 mL of toluene under $N_2$. A syringe was used to add the mixture slowly to the aged catalyst. Upon adding the monomer, the viscosity of the solution increased, and the color of the aged dark solution gradually changed from dark to dark red. The solution was left to stir for 12 h at 0° C. After 12 h, the solution was extremely viscous and could not stir. The reaction was quenched by the addition of MeOH to the solution. The product was isolated and purified with MeOH/HCl solution. After drying under vacuum at 80° C., the reaction yielded 0.98 g (82%) of dark red PAPA homopolymer solid.

Example 11: Synthesis of PA-Co-BPA Copolymer

In a 50 mL round bottom flask under inert conditions ($N_2$), $WCl_6$ as catalyst (95 mg) and $Ph_4Sn$ cocatalyst (102.5 mg) were dissolved in 6 mL of toluene. The solution was aged for 15 minutes at 0° C. At the same time, 4-bromophenylacetylene (3 g) and phenylacetylene (0.34 g) were dissolved in 6 mL of toluene in a separate flask under $N_2$ conditions. A syringe was used to add the monomer mixture slowly to the aged catalyst. The viscosity of the solution increased steadily with increasing time. The color of the aged dark solution gradually changed from dark black to dark red. The solution was left to stir for 12 h at 0° C. The reaction was quenched by the addition of 4 ml of isopropyl alcohol to the flask and allowed to stir for few minutes before adding 10 ml of MeOH to precipitate the polymer out of solution. The product was isolated and washed with MeOH/HCl solution few times. After drying under vacuum at 80° C. overnight, 2.782 g (83.3%) of dark red PA-co-BPA copolymer was obtained.

Example 12: Synthesis of PA-Co-PAPA Copolymer

The PA-co-BPA copolymer from Example 11 was used to prepare PA-PAPA copolymer. In a 100 mL flask, PA-BPA copolymer (2.5 g) was mixed with $Pd(PPh_3)_2Cl_2$ (369 mg) and CuI (140 mg) in 22 ml of THF solvent. After all the solids were completely dissolved, phenylacetylene (4.6 ml) and diisopropylamine (5.9 ml) simultaneously mixed in a separate flask were added slowly into the 100 ml flask via a syringe. The temperature of the reaction was increased to 60° C. and allowed to stir for 4 days. A gradual change in the color of the solution from dark red to dark brown was observed. The solution was cooled down before quenching with 50 ml of water. After stirring for few minutes, the entire solution was poured into 100 ml of methanol. The participated product was isolated and purified to yield 2.565 g (93%) of PA-co-PAPA copolymer as a dark-brown solid.

Examples 13: Preparation of PA-g-Pitch (B) Precursors

In a typical example, 2 g of PA-co-PAPA copolymer from Example 12 and 20 g of pitch resin were premixed in a 500 ml beaker to become a uniform mixture. Mechanical blending of the premixed sample was then conducted in a twin-screw brabender. This system has three thermocouples located at outer cover, sample chamber and inner wall to have a close monitor on temperature control. The heating rate was set to 10° C./min. Nitrogen flowed in the system through a rubber tube to create an air-free environment during mixing at a flow rate of 100 ml/min. Firstly, the premixed sample was loaded into the sample chamber at room temperature and was mixed at a rate of 100 rpm before the heating started. After the temperature reached 310° C., the sample was heat treated for 1 hour at this temperature with an increased mixing rate of 300 rpm. After it, the sample was cooled down by an air-cooling system with a cooling rate of 5° C./min. After blending, all collected samples were grounded into the power form by a mortar.

Example 14: Fiber Melt-Spinning Technique

A piston fiber extruder was used to spin the precursor sample into fibers. At the beginning, 5 g of precursor material, either PE-g-Pitch (A) or PA-g-Pitch (B) with some free pitch plasticizer, was converted to fine powders by using a mortar and loaded into the sample chamber. Then, the chamber was heated to 340° C. by a heating barrel and allowed to keep isothermal for 30 min before starting to apply pressure on the piston. The precursor came out of the chamber through a 100 um die and then was stretched and connected to a winder that was continually rotating.

Example 15: Fiber Electro-Spinning Technique

The setup for electrospinning consisted of a parallel position of the electrospinning machine to a high voltage power supply, a syringe pump, an 18G needle having a diameter of 1.25 mm and a rectangular (5×10 cm) glass slide as the collecting plate were used. A 2 ml polymer solution in THF was filled into the syringe and high voltage of 15 kV was applied to the tip of the needle. A flow rate of 10 ml/h was maintained using the syringe pump. Fibers of the polymers were collected on a glass slide, which was set at 30 cm distance from the tip of the needle.

REFERENCES

All references cited herein including those below are hereby incorporated by reference in their entirety.

U.S. Pat. No. 3,917,776 Sato, et al. "Process for producing carbon fiber".
U.S. Pat. No. 4,070,446 Horikiri, et al. "Process for production of carbon fiber".
U.S. Pat. No. 4,497,789 Sawran, et al. "Process for the manufacture of carbon fibers".
U.S. Pat. No. 4,895,712 Komine, et al. "Process for producing carbon fiber and graphite fiber".
U.S. Pat. No. 5,162,476 Hisatani, et al. "Stereoregular acrylonitrile polymer and composition comprising same".
U.S. Pat. No. 5,308,599 Kawamura, et al. "Process for producing pitch-based carbon fiber".
U.S. Pat. No. 5,543,484 Chung, et al. "Alpha-olefin/Para-alkylstyrene Copolymers and Functionalized Copolymers Thereof"
U.S. Pat. No. 5,721,308 Yamamoto, et al. "Pitch based carbon fiber and process for producing the same".
U.S. Pat. No. 5,968,435 Kato, et al. "Process for manufacturing pitch-type carbon fiber".
U.S. Pat. No. 6,524,501 Arai, et al. "Pitch fiber bundle and pitch type carbon fiber bundle and method for production thereof".
U.S. Pat. No. 6,428,891 Okuya, et al. "Acrylonitrile-based precursor fiber for carbon fiber and method for production thereof"
U.S. Pat. No. 7,338,997 Kuwahara, et al. "Polymer for carbon fiber precursor".
U.S. Pat. No. 7,678,358 Eckert, et al. "Carbon fibers from kraft softwood lignin"
U.S. Pat. No. 7,786,253 Paulauskas, et al. "Apparatus and method for oxidation and stabilization of polymeric materials".
U.S. Pat. No. 8,822,029 Tanaka, et al. "Polyacrylonitrile polymer, method of producing the same, method of producing precursor fiber used for producing carbon fiber, carbon fiber and method of producing the same".
U.S. Pat. No. 9,096,955 Naskar, et al. "Method for the preparation of carbon fiber from polyolefin fiber precursor, and carbon fibers made thereby".
U.S. Pat. No. 9,631,298 Lehmann, et al. "Method for the production of lignin-containing precursor fibres and also carbon fibres".
U.S. Pat. No. 9,777,408 Irisawa, et al. "Precursor fiber for carbon fibers, carbon fiber, and method for producing carbon fiber".
U.S. Pat. No. 9,828,700 Naskar, et al. "Method for the preparation of carbon fiber from polyolefin fiber precursor".
U.S. Pat. No. 10,006,152 Lehmann, et al. "Method for the production of lignin-containing precursor fibres and also carbon fibres"
U.S. Pat. No. 10,017,881 Shinmen, et al. "Polyacrylonitrile-based copolymer, polyacrylonitrile-based precursor fiber for carbon fiber, carbon fiber bundles, process for producing stabilized fiber bundles, and process for producing carbon fiber bundles".
U.S. Pat. No. 10,590,258 Chuang, et al. "Carbon fiber precursor composition and method for preparing carbon fiber precursor".
Mochida, I.; Sakai, Y.; Otsuka, H. "*Mesophase Pitch for use in the Making of Carbon Materials and Process for Producing the Same*". European Patent Application, Publication No. 0318843 A1.
Huang, X. "*Review Fabrication and Properties of Carbon Fibers*". Materials 2009, 2, 2369-2403.
Lee, S.; Kim, J.; Ku, B. C.; Kim, J.; Joh, H. I. "*Structural Evolution of Polyacrylonitrile Fibers in Stabilization and Carbonization*". Advances in Chemical Engineering and Science, 2012, 2, 275-282
Morris E. A.; Weisenberger, M. C.; Abdallah, M. G.; Vautard, F.; Grappe, H.; Ozcan, S.; Paulauskas, F. L.; Eberle, C.; Jackson, D.; Mecham, S. J.; Naskar, A. K. "*High Performance Carbon Fibers from Very High Molecular Weight Polyacrylonitrile Precursors*". Carbon 2016, 101, 245-252.
Liu, F.; Wang, H.; Linbing Xue, L.; Lidong Fan, L.; Zhu, Z. "*Effect of microstructure on the mechanical properties of PAN-based carbon fibers during high-temperature graphitization*". J Mater Sci 2008, 43, 4316-4322.

Dickinson, E. M. "Average Structures of Petroleum Pitch Fractions by JH and 13C NMR Spectroscopy". Fuel, 1985, 64, 704-706.
Cristadoro, A.; Kulkarni, S. U.; Burgess, W. A.; Cervo, E. G.; Rader, H. J.; Mullen, K.; Bruce, D. A.; Thies, M. C. "Structural characterization of the oligomeric constituents of petroleum pitches". Carbon 2009, 47, 2358-2370.
Matsumoto, T. "Mesophase Pitch and Its Carbon Fibers". Pure & Appl. Chem. 1985, 57, 1553-1562.
Brooks, J. D.; Taylor, G. H. "The Formation of Graphitizing Carbons from The Liquid Phase". Carbon 1965, 3, 185-193.
Liu, C.; Lafdi, K. "Fabrication and characterization of carbon nanofibers from polyacrylonitrile/pitch blends", J. Applied Polym. Sci. 2017, 134, 45388.
Cheng, Y.; Yang, L.; Luo, T.; Fang, C.; Su, J.; Hui, J. "Preparation and Characterization of Mesophase Pitch via Co-Carbonization of Waste Polyethylene/Petroleum Pitch". J. Mater. Sci. Tech. 2015, 31, 857-863.
Baker, D. A.; Rials, T. G. "Recent Advances in Low-Cost Carbon Fiber Manufacture from Lignin". J. Appl. Polym. Sci. 2013, 130, 713-728.
Krumpfer, J. W.; Giebel, E.; Frank, E.; Muller, A.; Ackermann, L. M.; Tironi, C. N.; Mourgas, G.; Unold, J.; Klapper, M.; Buchmeiser, M. R.; Mullen, K. "Poly(Methyl Vinyl Ketone) as a Potential Carbon Fiber Precursor". Chem. Mater. 2017, 29, 780-788.
Pimenta, M. A.; Dresselhaus, G.; Dresselhaus, M. S.; Cancado, L. G.; Jorioa, A.; R. Saito, R. "Studying disorder in graphite-based systems by Raman spectroscopy". Phys. Chem. Chem. Phys., 2007, 9, 1276-1291.
Takaku, A. Shioya, M. "X-Ray Measurements and the Structure of Polyacrylonitrile and Pitch-Based Carbon Fibres". J. Mater. Sci. 1990, 25, 4873-4879.
Smiley, R. J.; Delgass, W. N. "AFM, SEM and XPS Characterization of PAN-based Carbon Fibres Etched in Oxygen Plasmas". J. Mater. Sci. 1993, 28, 3601-3611.

We claim:

1. A carbon fiber precursor material comprising a polymeric pitch copolymer, wherein the polymeric pitch copolymer comprises a polymer chain and polycyclic aromatic hydrocarbon molecules in the side chains.

2. The carbon fiber precursor material of claim 1, further comprising free pitch resin.

3. The carbon fiber precursor material of claim 1, wherein the polymer chain comprises either polyethylene (PE), polypropylene, poly(1-butene), poly(1-pentene), poly(1-hexene), polystyrene, poly(methylstyrene), poly(isobutylene), polybutadiene, polyisoprene, polyacetylene, poly(phenylacetylene), or their copolymers.

4. The carbon fiber precursor material of claim 1, wherein the polymeric pitch copolymer possesses a weight-average molecular weight ranged from 30,000 to 2,000,000 g/mol.

5. The carbon fiber precursor material of claim 1, wherein the polymeric pitch copolymer possesses a polydispersity index between 1.1 and 20.

6. The carbon fiber precursor material of claim 1, wherein the polycyclic aromatic hydrocarbon molecules possess a molecular weight range from 160 to 1200 g/mol.

7. The carbon fiber precursor material of claim 1, wherein the polycyclic aromatic hydrocarbon molecules are either diphenylacetylene, anthracene, phenanthrene, tetracene, chrysene, triphenylene, pyrene, pentacene, benzo[a]pyrene, corannulene, benzoperylene, coronene, ovalene or their derivatives, and their mixtures.

8. The carbon fiber precursor material of claim 1, wherein the concentration of polycyclic aromatic hydrocarbon molecules in the polymeric pitch copolymer may be from 3 mol % to 100 mol %.

9. The carbon fiber precursor material of claim 2, wherein the weight ratio between the polymeric pitch copolymer and the free pitch resin is from 100/0 to 1/100.

10. The carbon fiber precursor material of claim 1, wherein the polymer chain comprises polyethylene (PE) and the polymeric pitch copolymer is represented by the following formula:

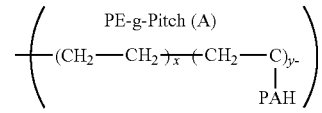

wherein x can be an integer repeating units ranging from 0 to 50,000, and
wherein y can be an integer repeating units ranging from 10 to 10,000.

11. The carbon fiber precursor material of claim 10, further comprising free pitch resin.

12. The carbon fiber precursor material of claim 10, wherein the polycyclic aromatic hydrocarbon molecules possess a molecular weight range from 160 to 1200 g/mol.

13. The carbon fiber precursor material of claim 10, wherein the polycyclic aromatic hydrocarbon molecule is diphenylacetylene.

14. The carbon fiber precursor material of claim 10, wherein the concentration of polycyclic aromatic hydrocarbon molecules in the polymeric pitch copolymer may be from 2 mol % to 100 mol %.

15. The carbon fiber precursor material of claim 1, wherein the polymer chain comprises poly(phenylacetylene) and the polymeric pitch copolymer is represented by the following formula:

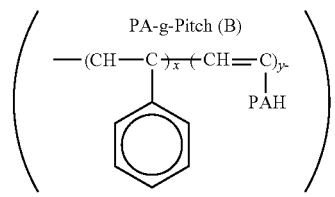

wherein x can be an integer repeating units ranging from 0 to 20,000, and
wherein y can be an integer repeating units ranging from 10 to 10,000.

16. The carbon fiber precursor material of claim 15, further comprising free pitch resin.

17. The carbon precursor material of claim 15, wherein the polycyclic aromatic hydrocarbon molecules possess a molecular weight range from 160 to 1200 g/mol.

18. The carbon fiber precursor material of claim 15, wherein the polycyclic aromatic hydrocarbon molecule is diphenylacetylene.

19. The carbon fiber precursor material of claim 10, wherein the concentration of polycyclic aromatic hydrocarbon molecules in the polymeric pitch copolymer may be from 2 mol % to 100 mol %.

20. A method for the synthesis of a carbon fiber precursor material comprising:

adding pitch resin to a polymer chain to form a mixture;
stirring the mixture under elevated temperature conditions until the formation of a polymeric pitch copolymer is complete,
wherein the polymer chain possesses reactive groups capable of grafting with the polycyclic aromatic hydrocarbon molecules in pitch resin.

21. The method of claim 20, wherein the monomer units containing reactive groups contribute 1% to 100% towards the total weight of the polymer chain.

22. The method of claim 20, wherein the method further comprises processing the polymeric pitch copolymer by melt-spinning and wet-spinning techniques to produce precursor microfibers.

23. The method of claim 20, wherein the polymeric pitch copolymer also contains free pitch resin.

* * * * *